(12) United States Patent
Reddy et al.

(10) Patent No.: US 9,359,543 B2
(45) Date of Patent: Jun. 7, 2016

(54) WELLBORE SERVICING METHODS AND COMPOSITIONS COMPRISING DEGRADABLE POLYMERS

(71) Applicant: Halliburton Energy Services, Inc., Houston, TX (US)

(72) Inventors: B. Raghava Reddy, Duncan, OK (US); Janette Cortez, Kingwood, TX (US); Andrea Ontiveros, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 190 days.

(21) Appl. No.: 14/146,821

(22) Filed: Jan. 3, 2014

(65) Prior Publication Data

US 2014/0138092 A1 May 22, 2014

Related U.S. Application Data

(63) Continuation-in-part of application No. 14/065,701, filed on Oct. 29, 2013, which is a continuation-in-part of application No. 13/660,740, filed on Oct. 25, 2012.

(51) Int. Cl.
*E21B 43/25* (2006.01)
*C09K 8/00* (2006.01)
*C09K 8/035* (2006.01)
*C09K 8/68* (2006.01)
*C09K 8/74* (2006.01)
(Continued)

(52) U.S. Cl.
CPC .............. *C09K 8/00* (2013.01); *C04B 40/0641* (2013.01); *C09K 8/035* (2013.01); *C09K 8/467* (2013.01); *C09K 8/68* (2013.01); *C09K 8/74* (2013.01); *E21B 43/25* (2013.01)

(58) Field of Classification Search
CPC ........... C09K 8/68; C09K 8/805; E21B 43/00
USPC ................. 166/300, 305.1, 307, 308.1, 308.2
See application file for complete search history.

(56) References Cited

U.S. PATENT DOCUMENTS 2,265,759 A * 12/1941 Lawton et al. ................. 507/237
2,290,411 A * 7/1942 Keiser et al. ................... 516/161
(Continued)

FOREIGN PATENT DOCUMENTS

WO 2015102802 A1 7/2015

OTHER PUBLICATIONS

International Search Report and Written Opinion for PCT/US2014/068551 dated Mar. 18, 2015.

*Primary Examiner* — Zakiya W Bates
*Assistant Examiner* — Silvana Runyan
(74) *Attorney, Agent, or Firm* — McDermott Will & Emery LLP; Craig Roddy

(57) ABSTRACT

Methods of servicing a wellbore and/or a subterranean formation including introducing a wellbore servicing fluid into the wellbore and/or the subterranean formation to degrade a degradable polymer therein by contacting the degradable polymer with a liquid neutralized degradation accelerator. The wellbore servicing fluid comprises a particulate salt degradation accelerator and a neutralizer activator. The particulate salt degradation accelerator is formed by reacting a degradation accelerator solution with an acid, the neutralizer activator is capable of dissociating the acid by neutralization from the particulate salt degradation accelerator so as to form the liquid neutralized degradation accelerator.

17 Claims, 4 Drawing Sheets

(51) Int. Cl.
*C04B 40/06* (2006.01)
*C09K 8/467* (2006.01)

(56) References Cited

U.S. PATENT DOCUMENTS

| | | |
|---|---|---|
| 7,565,929 B2 | 7/2009 | Bustos et al. |
| 7,779,915 B2 | 8/2010 | Hutchins et al. |
| 7,841,411 B2 | 11/2010 | Fuller et al. |
| 7,858,561 B2 | 12/2010 | Abad et al. |
| 7,896,068 B2 | 3/2011 | Lee |
| 2004/0261996 A1 | 12/2004 | Munoz et al. |
| 2007/0238622 A1* | 10/2007 | Fu et al. .................. 507/203 |
| 2008/0078549 A1 | 4/2008 | Moorehead et al. |
| 2008/0093073 A1 | 4/2008 | Bustos et al. |
| 2008/0119374 A1 | 5/2008 | Willberg et al. |
| 2008/0139417 A1 | 6/2008 | Alsyed et al. |
| 2008/0149335 A1 | 6/2008 | Lee |
| 2008/0210423 A1 | 9/2008 | Boney |
| 2008/0289828 A1 | 11/2008 | Hutchins et al. |
| 2009/0025934 A1* | 1/2009 | Hartman et al. ........... 166/280.2 |
| 2009/0075845 A1 | 3/2009 | Abad et al. |
| 2009/0105097 A1 | 4/2009 | Abad et al. |
| 2009/0151944 A1 | 6/2009 | Fuller et al. |
| 2010/0273685 A1 | 10/2010 | Saini et al. |
| 2010/0323932 A1 | 12/2010 | Bustos et al. |
| 2011/0030958 A1 | 2/2011 | Fedorov et al. |
| 2011/0284222 A1 | 11/2011 | Chaabouni et al. |
| 2013/0168096 A1 | 7/2013 | Parkhonyuk et al. |

* cited by examiner

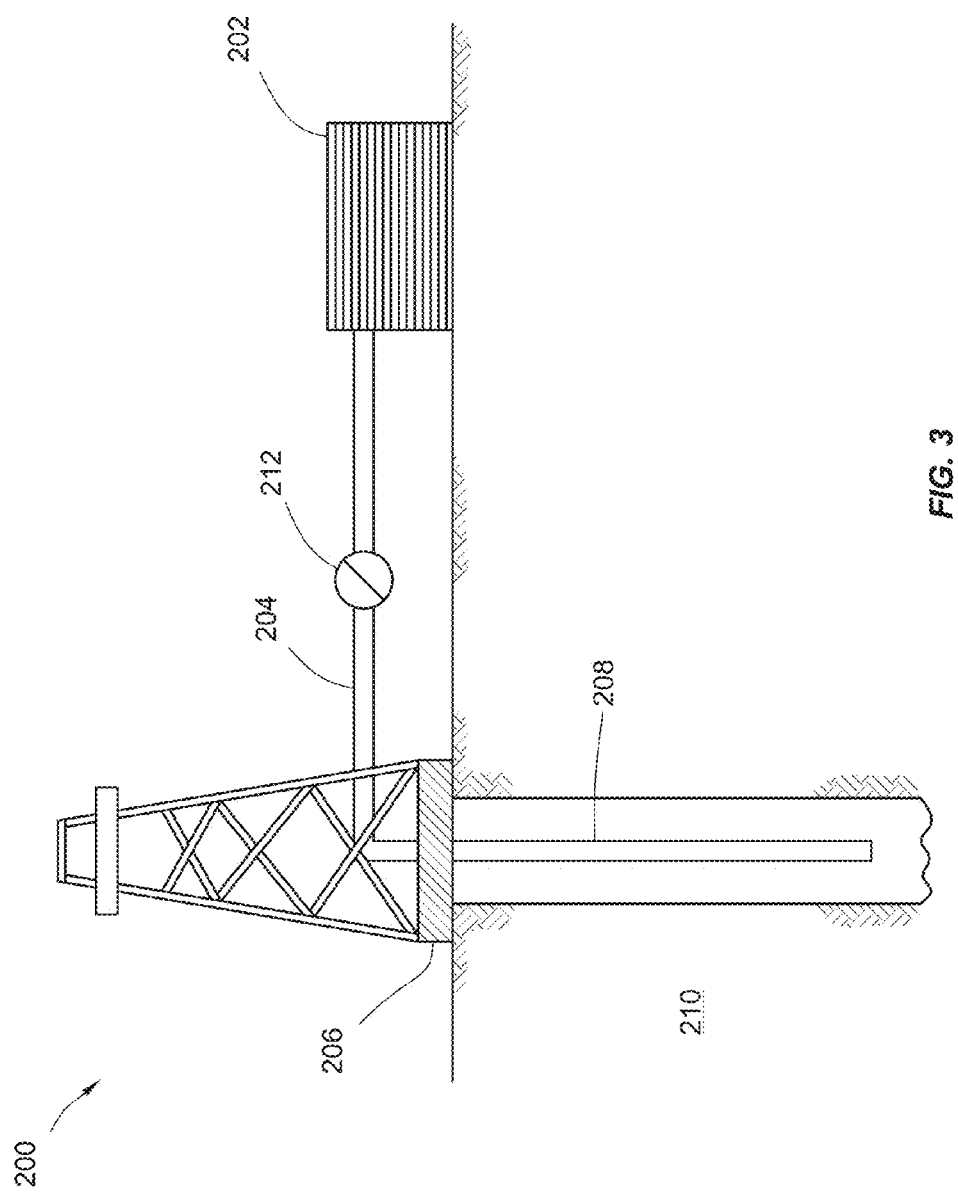

WELLBORE SERVICING METHODS AND COMPOSITIONS COMPRISING DEGRADABLE POLYMERS

CROSS-REFERENCE TO RELATED APPLICATIONS

This application is a Continuation-In-Part Application of U.S. patent application Ser. No. 14/065,701 filed on Oct. 29, 2013 which is a Continuation-In-Part Application of U.S. patent application Ser. No. 13/660,740, filed on Oct. 25, 2012 entitled "Wellbore Servicing Methods and Compositions Comprising Degradable Polymers."

BACKGROUND

This disclosure relates to methods and compositions for servicing a wellbore. More specifically, it relates to methods and compositions for use in a wellbore penetrating a subterranean formation.

Natural resources such as gas, oil, and water residing in a subterranean formation or zone are often recovered by drilling a wellbore into the subterranean formation while circulating a drilling fluid in the wellbore. After terminating the circulation of the drilling fluid, a string of pipe (e.g., casing) may be run in the wellbore. The drilling fluid may then be circulated through the interior of the pipe and out of the subterranean formation through the annulus formed between the subterranean formation and the pipe. Next, primary cementing may be performed whereby a cement slurry is placed in the annulus and permitted to set into a hard mass (i.e., sheath) to thereby attach the string of pipe to the walls of the wellbore and seal the annulus. Subsequent secondary cementing operations may also be performed.

Degradable polymers are increasingly becoming of interest for use in various subterranean applications based, at least in part, on their ability to degrade and leave voids, act as a temporary restriction to the flow of a fluid, or produce desirable degradation products (e.g., acids). One particular degradable polymer that has received recent attention is poly (lactic acid) ("PLA") because it is a material that will degrade downhole in aqueous media after it has performed a desired function or because its degradation products may be used to perform a desired function (e.g., degrade an acid soluble component, or lower fluid pH to breakdown borate crosslinked fluids).

Degradable polymers may be used to leave voids behind upon degradation to improve or restore the permeability of a given structure. For instance, a proppant pack may be created that comprises proppant particulates and degradable polymers so that, when the degradable polymer degrades, voids are formed in the proppant pack. Similarly, voids also may be created in a set cement in a subterranean environment. Moreover, degradable polymers may be used as a coating to temporarily protect a coated object or chemical from exposure to the subterranean environment. For example, a degrading agent or some other treatment chemical may be coated, encapsulated, or encaged with a degradable polymer and used in a subterranean operation such that the degrading agent may not be substantially exposed to the subterranean environment until the degradable polymer coating the degrading agent substantially degrades. Another use for degradable polymers in subterranean operations may involve creating downhole tools or parts of downhole tools using solid masses of one or more degradable polymers. In such operations, the degradable polymer may be designed such that it does not substantially degrade until the tool has completed its desired function. In some operations, a tool function may be temporarily delayed by coating with a degradable polymer. Still other uses for degradable polymers in subterranean operations may include their use as diverting agents, bridging agents, and fluid loss control agents.

Generally, degradation of a water-degradable polymer with suitable chemical composition and physical properties, for example PLA, may be most desirably achieved over a time period ranging from about few days to about a few weeks at bottom hole temperatures ("BHT") of above about 60° C. (140° F.). Unfortunately, many well bores have a BHT that may be lower than 60° C. In these lower temperature environments, a relatively longer time (e.g., weeks or even months) may be necessary for the degradable polymer to hydrolyze and breakdown, which may be undesirable. In other situations, degradable polymers that are stable for desired durations at high temperatures under downhole conditions may be needed. Such materials may be required to be more resistant to hydrolytic degradation (i.e., polymer chain scission due to reactions with water). In such cases, methods to accelerate the reactions with water to breakdown the degradable polymer at the end of an operation in a controlled and predictable manner may be of use. In general, irrespective of the BHT, it is desirable to be able to control and/or design a fluid composition with pre-specified rates and durations for degradation and removal of the degradable polymers employed to accomplish timed events or functions in order to minimize waiting-on-degradation time. It is understood that in order to flowback out or remove the degradable polymer from the location of its placement, it may not be necessary to break it totally down to the monomer level. For effective removal of the degradable polymer at the end of an intended operation, the percentage of polymer degradation needed may be as low as 20%. If used as a plug or filter cake, the degradable polymer may degrade to an extent sufficient to loosen packed particle density so that a flowing fluid may break up and flow out remaining un-degraded particulate material.

The quantities of the degradable polymer required to accomplish a desired objective may depend on, among other things, the type of application. For example, in a diversion operation during multistage fracturing, the amounts of degradable polymer needed may be as high as about 250 to about 500 lbs/1000 gal ("gal/Mgal"). It may be beneficial to reduce the amount of polymer utilized to accomplish a particular operation without sacrificing the intended performance objectives, which may reduce the cost of the.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 3 depicts an embodiment of a system configured for delivering the fluids comprising the DAs and/or DACs of the embodiments described herein to a downhole location.

DETAILED DESCRIPTION

Figure 1:
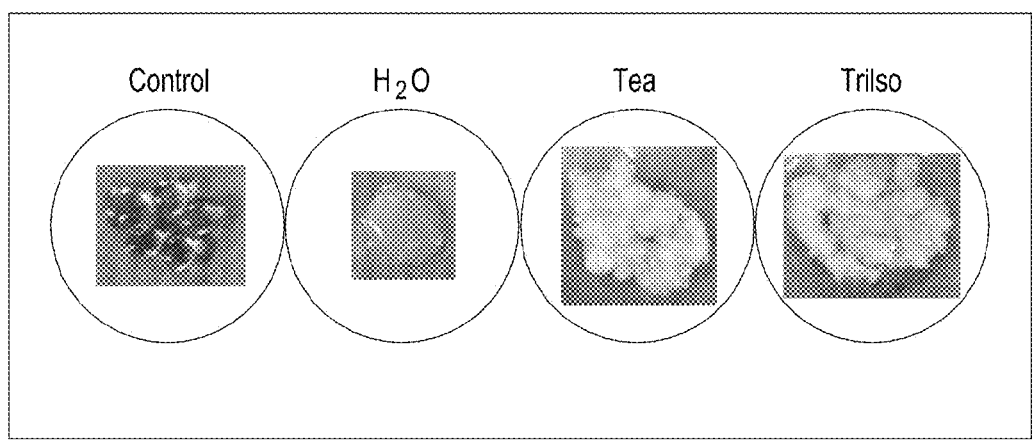
FIG. 1 is a picture of a degradable polymer swelling in the presence of water and materials described in some embodiments herein at 140° F. over a 2-day period.

This disclosure relates to methods and compositions for servicing a wellbore. More specifically, it relates to methods and compositions for use in a wellbore penetrating a subterranean formation.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques below, including the exemplary designs and implementations illustrated and described herein, but may be modified within the scope of the appended claims along with their full scope of equivalents.

Although some embodiments described herein are illustrated by reference to diverting operations, the degradable polymers and diverting agents disclosed herein may be used in any subterranean formation operation that may benefit from consolidation of particulates. Such treatment operations may include, but are not limited to, a drilling operation; a stimulation operation; an acidizing operation; an acid-fracturing operation; a sand control operation; a completion operation; a scale inhibiting operation; a water-blocking operation; a clay stabilizer operation; a fracturing operation; a frac-packing operation; a gravel packing operation; a wellbore strengthening operation; a sag control operation; and any combination thereof.

Moreover, the degradable polymers and diverting agents described herein may be used in any non-subterranean operation that may benefit from their properties. Such operations may be performed in any industry including, but not limited to, oil and gas, mining, chemical, pulp and paper, aerospace, medical, automotive, and the like.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

The methods of the present disclosure generally comprise providing a degradable aliphatic polymer, comprising carboxy functional groups in the polymer backbone derived from hydroxyalkanoic acid monomers, within a portion of a wellbore and/or subterranean formation, introducing a degradation accelerator ("DA") to the portion of the wellbore and/or subterranean formation, and allowing the DA to degrade or accelerate the degradation of the degradable polymer. The DA may be in the form of a pumpable fluid (e.g., present in an aqueous carrier fluid, a liquid additive, component of a wellbore servicing fluid, and the like). In some embodiments, the DA is a component of a solution. As used herein, the term "solution" does not connote any particular degree of dissolution or order of mixing of the substances present in the solution. In some embodiments, the DA material may increase the volume of the degradable polymer by in situ swelling prior to degradation. In other embodiments, the DA material may be in a particulate form, which may be included in a pumpable fluid in which it is completely or partially soluble. In some embodiments, the portion of the wellbore and/or subterranean formation where the degradable polymer is located may have a temperature of about 140° F. (60° C.) or less. In some embodiments, the portion of the wellbore and/or subterranean formation where the degradable polymer is located may have a temperature of higher than about 140° F. (60° C.). In some exemplary embodiments, at least 20% of the degradation of the degradable polymer may take place within a timeframe of less than about three days after the introduction of the DA.

In one embodiment, the DA comprises an alkanolamine, an oligomer of an aziridine (e.g., ethyleneimine), a polymer of aziridine, a diamine, any derivative thereof, or any combination thereof. These DAs may be liquids ("DA solution") at room temperature in their pure state. In other embodiments, the DA is a particulate salt DA (i.e., a "particulate salt degradation accelerator"), which may be referred to herein simply as "particulate DA," formed by creating a solid form by chemical derivatization of an alkanolamine, an oligomer of an aziridine (e.g., ethyleneimine), a polymer of aziridine, a diamine, any derivative thereof, and any combination thereof. As used herein, the term DA will collectively refer to both the DA solution and the particulate DA materials described herein. The term "derivative" is defined herein to include any compound that is made from one or more of the DAs, for example, by replacing one atom in the DA with another atom or group of atoms, rearranging two or more atoms in the DA, ionizing one of the DAs, or creating a salt of one of the DAs. When describing derivatives herein those materials are contemplated as being "derived by," "derived from," "formed by," or "formed from," other materials described herein and such terms are used in an informal sense and are not intended to reflect any specific synthesis method or procedure, unless specified otherwise.

In an embodiment, the DA comprises an alkanolamine. Alkanolamines are chemical compounds that contain a hydroxyl group (i.e., —OH) and an amine group, which may be a primary amine group, a secondary amine group or a tertiary amine group. An alkanolamine suitable for use in the present disclosure is a compound characterized by general Formula I:

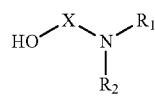

Formula I where R1 and R2 may each independently be hydrogen, an unsubstituted alkyl chain comprising from about 1 to about 6 carbon atoms, or a substituted alkyl chain comprising from about 3 to about 6 carbon atoms. In an embodiment, X may comprise a substituted or unsubstituted alkylene chain having from about 1 to about 4 carbon atoms. The term "alkyl group" is used herein in accordance with the definition specified by IUPAC: a univalent group formed by removing a hydrogen atom from an alkane. The term "alkylene" is used herein in accordance with the definition specified by IUPAC: the divalent groups formed from alkanes by removal of two hydrogen atoms form the same carbon atom. The term "substituted" when used to describe a group is intended to describe any non-hydrogen moiety that formally replaces a hydrogen in that group and is intended to be non-limiting.

In an embodiment, R1 and R2 may both be hydrogen, creating a primary amine; either R1 or R2 may be a hydrogen, creating a secondary amine; or R1 and R2 may be substituent groups other than hydrogen, creating a tertiary amine.

Nonlimiting examples of alkanolamines suitable for use in the present disclosure include monoethanolamine, triethanolamine, diethanolamine, triisopropanolamine, diglycolamine, di-2-propanolamine, N-methyldiethanolamine, 2-amino-2-methyl-l-propanol, 2-piperidineethanol, aminopropanediol and the like.

In an embodiment, the DA comprises an alkanolamine in the form of an aqueous solution with a concentration of from about 10 weight percent (wt. %) to about 99 wt. %, alternatively from about 40 wt. % to about 85 wt. %, or alternatively from about 50 wt. % to about 80 wt. % based on the total weight of the solution. In an embodiment, the alkanolamine solution may have a pH of less than about 11, alternatively less than about 10, or alternatively less than about 9.

In an embodiment, the DA comprises oligomers of aziridine or of aziridine derivatives (e.g., ethyleneimine). Herein the disclosure may refer to an oligomer of aziridine and/or an oligomer of an aziridine derivative. It is to be understood that the terms aziridine oligomer and aziridine derivative oligomer herein are used interchangeably. The aziridine oligomers may comprise amines containing at least one secondary and/or at least one tertiary nitrogen (i.e., at least one secondary (—NH—) and/or at least one tertiary (—N<) amine group). Additionally, the aziridine oligomers may also contain at least one primary nitrogen (i.e., primary amine groups (—NH2)). In an embodiment, the number of monomers in the aziridine oligomer is less than about 100, alternatively less than about 10, or alternatively less than about 5.

In an embodiment, the aziridine oligomer comprises a linear aziridine oligomer characterized by general Formula II:

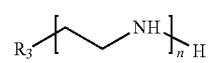

Formula II where the value of n ranges from about 2 to about 100, alternatively from about 2 to about 10, alternatively from about 2 to about 5, or alternatively from about 2 to about 4. In an embodiment, R3 comprises a primary amine group (—NH2). Alternatively, R3 may comprise the aziridine ring connected to the repeating oligomer unit through the aziridine ring nitrogen. In an embodiment, the aziridine oligomer comprises diethylenetriamine (i.e., n=2). In an embodiment, the aziridine oligomer comprises triethylenetetramine (i.e., n=3). In another embodiment, the aziridine oligomer comprises tetraethylenepentamine (i.e., n=4).

In an embodiment, the aziridine oligomer comprises an aziridine oligomer characterized by general Formula III:

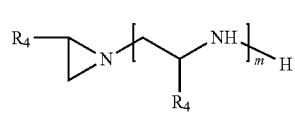

Formula III where the value of m ranges from about 2 to about 100, alternatively from about 2 to about 10, alternatively from about 2 to about 5, or alternatively from about 2 to about 4. While the structure depicted by Formula III only shows one of the hydrogens from the methylene groups of the aziridine ring being substituted with a R4 group, both of the aziridine methylene groups may be substituted. In an embodiment, R4 and any of the other aziridine methylene group substituents comprise methyl groups.

In an embodiment, the aziridine oligomer comprises a branched aziridine oligomer. In an embodiment, the branched aziridine oligomer comprises a branched oligo-ethyleneimine characterized by general Formula IV:

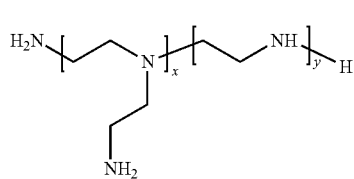

Formula IV where the repeating units may occur in a total amount of about (x+y) with the total value of (x+y) ranging from about 2 to about 50, alternatively from about 2 to about 30, alternatively from about 2 to about 10, or alternatively from about 2 to about 5. In all cases, x or y is greater than or equal to 1.

In an embodiment, the DA comprises an aziridine oligomer in the form of an aqueous solution with a concentration of from about 10 wt. % to about 99 wt. %, alternatively from about 40 wt. % to about 85 wt. %, or alternatively from about 50 wt. % to about 80 wt. % based on the total weight of the solution. In an embodiment, the aziridine oligomer solution may have a pH of less than about 11, alternatively less than about 10, or alternatively less than about 9.

In an embodiment, the DA comprises an aziridine polymer, wherein the n and m values in Formula II and Formula III respectively or (x+y) value in Formula IV are greater than about 100, alternately greater than about 1000, or alternately greater than about 10000. In an embodiment, the DA comprises an aziridine polymer in the form of an aqueous solution with a concentration of from about 10 wt. % to about 99 wt. %, alternatively from about 40 wt. % to about 85 wt. %, or alternatively from about 50 wt. % to about 80 wt. % based on the total weight of the solution. In an embodiment, the aziridine polymer solution may have a pH of less than about 11, alternatively less than about 10, or alternatively less than about 9. An example of an aziridine polymer suitable for use in the present disclosure is HZ-20™ crosslinker, commercially available from Halliburton Energy Services, Inc. in Houston, Tex.

In an embodiment, the DA comprises a diamine. Diamines are chemical compounds that contain two amine groups. A diamine suitable for use in the present disclosure is a compound characterized by general Formula V:

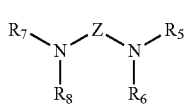

Formula V where R5, R6, R7, and R8 may each independently be hydrogen, an unsubstituted alkyl chain having from about 1 to about 3 carbon atoms, or a substituted alkyl chain having from about 3 to about 4 carbon atoms and Z comprises an unsubstituted alkylene chain having from about 2 to about 6 carbon atoms, or a substituted alkylene chain having from about 2 to about 6 carbon atoms. In an embodiment, Z comprises 2 carbon atoms resulting in an unsubstituted alkylene chain (i.e., ethylene group). In such an embodiment, at least one of R5, R6, R7, or R8 is not a hydrogen. In an embodiment, the diamine DA does not comprise ethylenediamine.

In an embodiment, the DA comprises a diamine in the form of an aqueous solution with a concentration of from about 10 wt. % to about 99 wt. %, alternatively from about 40 wt. % to about 85 wt. %, or alternatively from about 50 wt. % to about 80 wt. % based on the total weight of the solution. In an embodiment, the diamine solution comprises an aqueous fluid (e.g., water) and may have a pH of less than about 11, alternatively less than about 10, or alternatively less than about 9.

In an embodiment, the DA comprises amine nitrogens and/or groups which are chemically derivatized to contain an operable functionality or substituent. The operable functionality or substituent may be acted upon in any fashion (e.g., chemically, physically, thermally, etc.) and under any conditions compatible with the process in order to release the DA at a desired time and/or under desired conditions such as in situ wellbore conditions (e.g., temperature, pH induced hydrolysis/neutralization, and the like). Upon removal of the operable functionality or substituent, the active form of the DA can be released and made available for polymer degradation. In an embodiment, a DA of the type disclosed herein is utilized in high temperature applications (e.g., at temperatures greater than about 90° C., alternatively greater than about 120° C., or alternatively greater than about 150° C.). Any suitable operable functionality or substituent or methods for preparing DAs containing operable functionalities or substituents may be employed. A non-limiting example of such methodologies include acylation of primary or secondary nitrogen atoms or the alcohol groups of the DA molecules utilizing any suitable acylating agent such as acid anhydrides, esters, anhydrides and acid chlorides. An example of a chemically derivatized DA comprising amine nitrogens is tetracetyl ethylene diamine, which upon in situ hydrolysis in a wellbore or formation can generate a mixture of amines, which function as DAs of the type disclosed herein. In an embodiment, a chemically derivatized DA is insoluble in the aqueous fluid. In an embodiment, the DAs may be reacted with acids, which may be organic or inorganic (e.g., mineral acid), to convert them into salts (i.e., corresponding ammonium salts). Such salts may be ineffective in their salt form at degrading the degradable polymers, and require an activation step to function as DAs. That is, reaction of the DAs described herein with an acid may convert to DAs into a deactivated form, requiring later contact with an activator to activate (e.g., by neutralization of the acid component of the DA salt to release the active base form of the DA material) the DAs, such that they may degrade the degradable polymers described herein.

Degradable aliphatic polymers suitable for use in the methods of the present disclosure are those capable of being degraded by water in an aqueous solution through a mechanism described herein or any other suitable mechanism, and comprise carboxy (—COO—) functional groups in the polymer backbone. Examples of functional groups that comprise —COO— groups include esters (C—COO—C), carbonates (C—O—COO—C), and carbamates (C—N—COO—C). This degradation may be the result of a chemical reaction with water under neutral pH conditions, acid- or base-catalyzed conditions or under thermally-activated conditions, or a combination thereof, and the degradation may occur over time as opposed to immediately. In some embodiments, degradation of the degradable polymers may be the result of hydrolytic and/or aminolytic degradation in the presence of DA materials of the type disclosed herein. As used herein, the terms "degrading," "degradation," and "degradable" refer to both the relatively extreme cases of hydrolytic or aminolytic degradation that the degradable polymer may undergo (i.e., heterogeneous or bulk erosion) and homogeneous (or surface erosion) down to the monomer level, and any stage of degradation in between. The terms "polymer" or "polymers" as used herein do not imply any particular degree of polymerization; for instance, oligomers are encompassed within this definition provided that such materials are solid particulates, and remain substantially insoluble in an aqueous medium for at least 3 to 8 hours at BHT.

In some instances, the degradable polymer may be capable of releasing a desirable degradation product (e.g., an acid or a base or a neutral molecule) during its degradation. Among other things, the degradable polymers capable of releasing an acid may degrade after a desired time to release an acid, for example, to degrade a filter cake, to lower pH, or to reduce the viscosity of a treatment fluid. Alternately, the degradable polymers capable of releasing acidic, neutral or basic materials may degrade after a desired time to release such materials, for example, to chelate metal ions capable of forming soluble materials to prevent scale depositions in the permeable portions of the formation.

In an embodiment, the degradable polymer comprises carboxylic acid-derived (i.e., —COO—) functional groups on the polymer backbone. Examples of suitable degradable polymers that may be used in conjunction with the methods of this may disclosure include, but are not limited to, aliphatic polyesters, poly(lactides), poly(glycolides), poly(ε-caprolactones), poly(hydroxy ester ethers), poly(hydroxybutyrates), poly(anhydrides), poly(carbonates), poly(ether esters), poly (ester amides), poly(carbamates) and copolymers, blends, derivatives, or combinations of any of these degradable polymers. The term "derivative" is defined herein to include any compound that is made from one of the listed compounds, for example, by replacing one atom in the listed compound with another atom or group of atoms, rearranging two or more atoms in the listed compound, ionizing one of the listed compounds, or creating a salt of one of the listed compounds. The term "copolymer" as used herein is not limited to copolymerization of a combination of two monomers, but includes any combination of any number of monomers, e.g., graft polymers, terpolymers and the like. For example, suitable copolymers may include an aliphatic polyester that is grafted with polyethylene oxide or polyacrylamide, or block polymers containing one or more blocks containing a carboxy (—COO—) group and another block containing non-carboxy containing polymer segment such as polyamide, poly(alkylene oxide), poly(anhydride), polyacrylamide, or poly(2-acrylamido-2-methylpropane sulfonic acid).

Degradable polymers comprising an anhydride bond may be the most reactive of the degradable polymers (e.g., they may have faster degradation rates, even at low temperatures). Suitable DAs may enhance the rate of a degradation reaction. In embodiments wherein the temperature of the surrounding subterranean formation is low, (e.g., temperatures in the range of from about 50° F. (10° C.) to about 140° F. (60° C.)), the degradable polymer used may be an anhydride, as such degradable polymers are thought to hydrolyze more readily. According to some embodiments in which the degradable polymer comprises a polyanhydride, the degradable polymer may be made to hydrolyze at a higher temperature by increasing the hydrophobicity of the degradable polymer so that water does not reach the hydrolyzable group as readily. In general, the hydrophobicity of a polyanhydride may be increased by increasing the size or carbon number of hydrocarbon groups in these polymers. Degradable polymers that contain an ester bond (e.g., polylactide, polyglycolide, etc.) may degrade more slowly, and when copolymerized with a reactive monomer such as an anhydride, the degradation reactivity may be adjusted to meet some user and/or process needs. Simple melt blends of degradable polymers of different degradation rates and/or physical properties may be utilized (e.g., glass transition temperatures, melting temperature, crystallization temperatures, and crystalline content), provided at least one component of such blends comprises an aliphatic degradable polymer comprising carboxy (—COO—) groups in the polymer backbone are also suitable for use in the present disclosure. In exemplary embodiments, aliphatic polyesters such as poly(lactic acid), poly(anhydrides), and poly(lactide)-co-poly(glycolide) copolymers may be used.

The particulate DAs for use in the methods of the present invention may be the solid form of salts of any of the DA solutions (e.g., liquid DAs) listed above and may thereafter be "activated" to release the active form of the DA solution (e.g., liquid DAs) to degrade the degradable polymers disclosed herein. Particulate DAs may be formed by reacting one or more amine groups of any of the DAs listed above, including, but not limited to, an alkanolamine, an oligomer of an aziridine, a polymer of aziridine, a diamine, any derivative thereof, and any combination thereof, with an acid capable of causing the DA to form a salt which is a solid or particulate material at room temperature in a dry state. The acid may be any acid capable of causing the DA to adopt a solid or particulate form. In some embodiments, the acid may include without limitation an organic acid, an inorganic acid (e.g., mineral acid), and any combination thereof. Suitable inorganic acids for use in forming the particulate DAs described herein may include, but are not limited to, hydrochloric acid, nitric acid, phosphoric acid, sulfuric acid, boric acid, hydrofluoric acid, hydrobromic acid, perchloric acid, and any combination thereof. Suitable inorganic acids for use in forming the particulate DAs described herein may include, but are not limited to, lactic acid, acetic acid, formic acid, citric acid, oxalic acid, tartaric acid, benzoic acid, phthalic acid, and any combination thereof.

In some embodiments, the acid necessary to form a particulate DA may be any amount necessary to react with one or more amine groups in forming the DA solution so as to cause the DA to adopt a particulate or solid form. For example, in some embodiments, it may not be necessary to react all of the nitrogen atoms in a DA molecule with the acid to convert the DA molecule into a particulate form in the dry state. The number of nitrogen atoms in a DA molecule that must be reacted with an acid to convert the DA into particulate form may depend on, among other things, the number of nitrogen atoms in the DA molecule, the chemical composition of the acid, and the like. The number of nitrogen atoms that must be reacted with an acid to convert a DA into particulate form may range from a lower limit of about 10%, 15%, 20%, 25%, 30%, 35%, 40%, and 50% to an upper limit of about 100%, 95%, 90%, 85%, 80%, 75%, 70%, 65%, 60%, 55, and 50% of the nitrogen atoms present. One of ordinary skill in the art, with the benefit of this disclosure, will be capable of determining (e.g., by experimentation) the amount of acid necessary to form the particulate DAs described in some embodiments herein. Examples of suitable particulate DAs for use in the methods of the present disclosure may include, but are not limited to, ethylenediamine dihydrochloride, triethanolamine hydrochloride, dietheylene triamine citrate, and any combination thereof.

The DA may be in particulate form to, among other things, facilitate storage and shipping of the DA. The DA solutions provided herein are effective degradation accelerators, but may be corrosive or otherwise toxic or disfavored for use in certain geographical locations, in certain subterranean operations, or by certain operators. For example, ethylenediamine ("EDA") is an effective DA solution material, in accordance with the embodiments of the present disclosure. However, EDA may present certain health, safety, and environmental ("HSE") concerns. Causing the EDA to form a particulate DA by reacting it with hydrochloric acid to form ethylenediamine dihydrochloride (EDA.2HCl) may substantially decrease the HSE concerns by shielding the free base form. Thus, the storage and shipping of a DA in particulate form may present little or no concerns, or at least reduced hazard concerns. Information for both EDA and EDA.2HCl salt is shown in Table 1, based on data by the National Fire Protection Association ("NFPA") rating for flammability, health, and reactivity; by the Occupational Safety and Health Administration ("OSHA") Globally Harmonized System of classification and labeling of Chemicals ("GHS") pictogram results; the $LD_{50}$ toxicity rating; and the Department of Transportation ("DOT") class and packaging group rating. It is evident that EDA.2HCl presents less HSE concerns than EDA.

TABLE 1

|  | EDA | EDA•2HCl |
|---|---|---|
| Physical Form | Liquid | Solid |
| NFPA Rating: Health | 3 | 2 (in some instances 1) |
| NFPA Rating: Flammability | 3 | 0 (in some instances 1) |
| NFPA Rating: Reactivity | 0 | 0 |
| GHS Pictogram | Flammable Health Hazard Corrosion Irritant | Health Hazard Irritant |

TABLE 1-continued

| | EDA | EDA•2HCl |
|---|---|---|
| LD$_{50}$ Toxicity | 866/1200 mg/kg (Rat) | 1600 mg/kg (Mouse) |
| DOT Packaging Group | Class 8, Packaging Group II | Not Controlled |

Figure 2A:
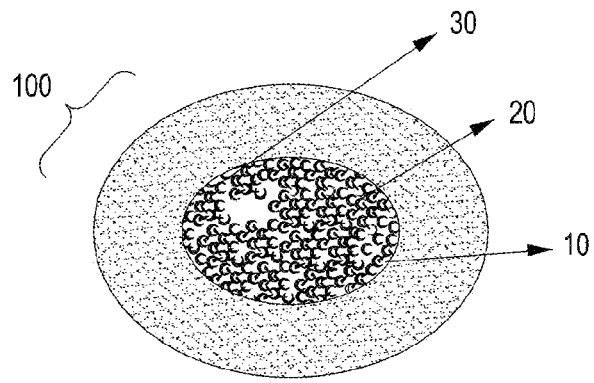
FIG. 2A-C depicts various embodiments of the delayed-action construct ("DAC") compositions described herein.

In an embodiment, the particulate DA may be introduced in into the wellbore in the form of a delayed-action construct ("DAC") of the type depicted in FIG. 2. Referring to FIG. 2A, the DAC 100 may comprise a DA 20 on a solid support 30, which may be encapsulated by an encapsulating material 10. In some embodiments, the particulate DA (i.e., salt) may be encapsulated directly without depositing it on a solid support. Details of the solid support and encapsulation material are discussed in further detail below.

To operate as effective degradation accelerators, the particulate salts of the DAs must be activated by neutralization of the acid component (e.g., mineral acid or organic acid) of the salt with a base and convert the particulate DA into liquid form (i.e., converting to the free base form of the DA), referred to herein as a "neutralized degradation accelerator" or "neutralized DA." Such neutralization may be performed in an aqueous fluid, as described in some embodiments herein. The particulate DA/DAC may be included in the aqueous fluid (e.g., by dissolution or suspension) and neutralized either in situ at a particular target zone within a wellbore and/or a subterranean formation or may be neutralized just prior to introducing the aqueous fluid comprising the particulate DA/DAC and the neutralizer activator into a wellbore and/or a subterranean formation. In some embodiments, the particulate DA may be neutralized either on-site or in situ. In other embodiments, the particulate DA/DAC and the degradable polymer may be introduced into a wellbore and/or a subterranean formation, and may be made to contact a target zone therein, followed by introduction of the neutralizer activator, which may activate the particulate DA/DAC and cause it to degrade the degradable polymer. In other embodiments, the degradable polymer may be first introduced into a wellbore and/or subterranean formation followed by introduction of the particulate DA/DAC and/or the neutralizer activator in any order or simultaneously. In other embodiments, the neutralizer activator may be placed within the wellbore and/or subterranean formation followed by introduction of the degradable polymer and/or the particulate DA/DAC in any order or simultaneously. In still other embodiments, the degradable polymer, particulate DA/DAC, and the neutralizer activator may be introduced simultaneously into a wellbore and/or subterranean formation in a single wellbore servicing fluid.

The basic neutralizer activator may be included within the aqueous fluid comprising the particulate DA/DAC in the amount necessary to convert substantially all of the particulate DA/DAC into its free base form (i.e., neutralized degradation accelerator form), i.e., in the stoichiometric amount. As used herein, the term "stoichiometric amount" in all of its variants (e.g., stoichiometric ratio) refers to an optimum amount of basic neutralizer activator such that substantially all of the particulate DA salt is converted into its free base form. The "stoichiometric amount" of basic neutralizer activator may range from the calculated molar equivalent of the basic neutralizer activator (hereinafter referred to as the "calculated stoichiometric amount") required to neutralize the moles of acid used to form the particulate DA salt, such as in the case of strongly basic neutralizer activators (e.g., alkali metal hydroxides), to substantially larger than the calculated stoichiometric amount, such as in the case of weak basic neutralizer activators. In some embodiments, an excess of neutralizer activator may be used to further enhance the degradation of the degradable polymer by the particulate DA/DAC (e.g., to bring the pH of a fluid comprising the particulate DA to a pH closer or greater than that of the DA solution form, or non-particulate DA form, to achieve the same degradation rates or duration). Bringing the pH closer or greater than that of the DA solution form may indicate the breakdown of the particulate DA into the neutralized DA form, which is equivalent to the DA solutions described herein. In some embodiments, the pKa (i.e., the negative logarithm of acid dissociation constant) of the neutralizer activator may be at least 11, alternatively at least 12, or alternatively at least 13. In some embodiments, the neutralizer activator may be present in at least the calculated stoichiometric amount. In other embodiments, the neutralizer activator may be present in an amount in excess of the calculated stoichiometric amount in the range of from about 0.1% to greater than about 200%, alternatively from about 20% to greater than about 175%, or alternatively from about 50% to greater than about 150% of the calculated stoichiometric amount.

Suitable neutralizer activators for use in the methods of the present disclosure may include, but are not limited to, oxides of alkali metals, hydroxides of alkali metals, oxides of alkaline earth metals, hydroxides of alkaline earth metals, and any combination thereof. Specific examples of suitable oxides and hydroxides of alkali metals and alkaline earth metals may include without limitation sodium hydroxide, sodium oxide, ammonium hydroxide, ammonium oxide, magnesium hydroxide, magnesium oxide, calcium hydroxide, calcium oxide, lithium hydroxide, lithium oxide, barium hydroxide, barium oxide, and any combination thereof. In some embodiments, alkali metal carbonates, alkaline earth metal carbonates, ammonium carbonates, alkali metal bicarbonates, and any combination thereof may be used as neutralizer activators according to some embodiments described herein, although it may be less effective than oxides and hydroxides of alkali metals and alkaline earth metals, depending on the particular application. One of ordinary skill in the art, with the benefit of this disclosure, will recognize the proper neutralizer activator to activate the particulate DA(s) selected.

The choice of degradable polymers may depend on the particular application and the conditions involved. For example, degradable polymers may include those degradable materials that release useful or desirable degradation products (e.g., an acid, base or neutral compound(s)). Such degradation products may be useful in a downhole application, for example, to break a viscosified treatment fluid or an acid soluble component present therein (such as in a filter cake), to lower the pH or to act as scale inhibitors. Other guidelines to consider in selecting a degradable polymer include the time required for the requisite degree of degradation and the desired result of the degradation (e.g., voids).

In an embodiment, the degradable polymer is an aliphatic polyester, such as PLA. Other degradable polymers comprising carboxy groups (—COO—) that are subject to hydrolytic and/or aminolytic degradation may also be suitable for use in the present disclosure. In embodiments in which the degradable polymer is PLA, the PLA may have been synthesized from lactic acid by a condensation reaction or, more commonly, by ring-opening polymerization of cyclic lactide monomer. Since both lactic acid and lactide can achieve the same repeating unit, the general term "poly(lactic acid)" as used herein refers to a polymer made from lactides, lactic acid, or oligomers, without reference to the degree of polymerization. The lactide monomer exists generally in three different forms: two stereoisomers L- and D-lactide and racemic D,L-lactide (meso-lactide).

The chirality of the lactide units provides a means to adjust, among other things, degradation rates, as well as physical and mechanical properties. Poly(L-lactide), for instance, is a semicrystalline polymer with a relatively slow hydrolysis rate. This may be desirable in applications of the present disclosure where a slower degradation of the degradable polymers is desired. Poly(D,L-lactide) may be a more amorphous polymer with a resultant faster hydrolysis rate. This may be suitable for other applications where a more rapid degradation may be appropriate. The stereoisomers of lactic acid may be used individually or combined to be used in accordance with the present disclosure. Additionally, they may be copolymerized with, for example, glycolide or other monomers like ε-caprolactone, 1,5-dioxepan-2-one, trimethylene carbonate, or other suitable monomers to obtain polymers with different properties or degradation times. The lactic acid stereoisomers can be modified to be used in the present disclosure by, among other things, blending, copolymerizing or otherwise mixing the stereoisomers, by blending, copolymerizing or otherwise mixing high and low molecular weight PLA, or by blending, copolymerizing or otherwise mixing a PLA with another polyester or polyesters.

Plasticizers may be included in the degradable polymers used in the methods of the present disclosure. The plasticizers may be present in an amount sufficient to provide characteristics that may be desired, for example, to provide tackiness of the generated degradable polymers or to provide improved melt processability. In addition, the plasticizers may enhance the degradation rate of the degradable polymers. The plasticizers, if used, are at least intimately incorporated within the degradable polymers. An example of a suitable plasticizer for poly(lactic acid) would include oligomeric lactic acid. Examples of plasticizers that may be useful in some embodiments of the present disclosure include, but are not limited to, polyethylene glycol (PEG); polyethylene oxide; oligomeric lactic acid; citrate esters (such as tributyl citrate oligomers, triethyl citrate, acetyltributyl citrate, and acetyltriethyl citrate); glucose monoesters; partially hydrolyzed fatty acid esters; PEG monolaurate; triacetin; poly(ε-caprolactone); poly(hydroxybutyrate); glycerin-1-benzoate-2,3-dilaurate; glycerin-2-benzoate-1,3-dilaurate; bis(butyl diethylene glycol)adipate; ethylphthalylethyl glycolate; glycerin diacetate monocaprylate; diacetyl monoacyl glycerol; polypropylene glycol (and epoxy derivatives thereof); poly(propylene glycol)dibenzoate; dipropylene glycol dibenzoate; glycerol; ethyl phthalyl ethyl glycolate; poly(ethylene adipate)distearate; di-iso-butyl adipate; or any combinations thereof. The choice of an appropriate plasticizer will depend on the particular degradable polymer utilized. It should be noted that, in certain embodiments, when initially formed, the degradable polymer may be somewhat pliable. But once substantially all of the solvent has been removed, the particulates may harden. More pliable degradable polymers may be beneficial in certain chosen applications. The addition of a plasticizer can affect the relative degree of pliability. Also, the relative degree of crystallinity and amorphousness of the degradable polymer can affect the relative hardness of the degradable polymers. In turn, the relative hardness of the degradable polymers may affect the ability of the DA to degrade the degradable polymer at low temperatures.

In some embodiments in which a degradable polymer is degraded through a DA catalyzed, or mediated pathway and/or through a pathway that involves a DA as the reactant, the DA provides a nucleophile capable of participating in the degradation of the degradable polymer in low temperature subterranean environments, for example, at a BHT of less than about 180° F. (82.2° C.), alternatively less than about 160° F. (71.1° C.), or alternatively less than about 140° F. (60° C.). Alternately the degradable polymer is designed for high temperature applications by suitably modifying the structure of the polymer.

The DA may provide a nucleophile to accelerate the degradation rate that would be possible when the polymer is allowed to degrade in the presence of an aqueous fluid not containing the DA. Alternately, a derivatized DA can be used to delay the release of active form DA at high temperatures. For example, such high temperatures may be greater than about 180° F. (82.2° C.), alternatively greater than about 250° F. (121.1° C.) or alternatively greater than about 300° F. (148.9° C.)

In some exemplary embodiments, the degradation of the degradable polymer in the presence of the DA may take place within a timeframe of less than about 1 month, alternatively less than about 2 weeks, alternatively less than about 1 week, or alternatively less than about 3 days.

The amount of DA that may be used to degrade a degradable polymer in the present disclosure will depend on several factors including, but not limited to, the pH of the DA solution, the pH of the aqueous solution comprising the DA, the nucleophilicity of nucleophiles present, the type degradable polymer, the temperature of the subterranean formation, the nature of the subterranean formation, the desired time and/or rate of degradation, and the like. In some embodiments, the molar ratio of the DA to the degradable polymer is equivalent (i.e., calculated based on the molar quantities of —COO— units in the polymer, and the molar quantities of nucleophilic centers in the DA molecules) or slightly greater than (e.g., about 10%) the stoichiometric ratio. In some embodiments, the amount of DA is in an amount sufficient to degrade equal to or greater than about 20% of the degradable polymer, alternatively equal to or greater than about 50% of the degradable polymer, or alternatively equal to or greater than about 70% of the degradable polymer wherein polymer degradation is measured by degradable polymer weight loss under wellbore conditions over a specified duration. In some embodiments, the DA may be present in amounts not less than about 20% of the calculated stoichiometric amounts in relation to the molar amounts of the ester groups present in the degradable polymer it is intended to degrade. The molar amounts of the ester groups may be calculated by dividing the estimated weight of the degradable polymer by the estimated molecular weights of the monomers present in the degradable polymer. The molar amounts of the DAs may be calculated by dividing the estimated weight of the active DA content by the molecular weight of the monomer (e.g., aziridine) or the DA molecule (e.g., triethanolamine).

In some embodiments, the degradable polymer may swell and absorb water in an aqueous media comprising the DA to a greater extent than the swelling of the degradable polymer observed in the aqueous media without the DA. In an embodiment, the DA functions initially to swell the degradable polymer and later to degrade the degradable polymer. In another embodiment, both swelling and degradation of the degradable polymer in the presence of the DA take place simultaneously. In yet another embodiment, the DA may swell but not degrade the degradable polymer, and vice versa.

In an embodiment, the degradable polymer swells at least about 2 times its volume, alternatively at least about 5 times, or alternatively at least about 10 times in the presence of the DA. In an embodiment, the degradable polymer increases in weight, in the presence of DA, by at least about 2 times its mass, alternately at least about 3 times or alternately at least about 10 times its mass prior to the reduction in weight as a result of degradation of the degradable polymer.

According to certain embodiments of the present disclosure, while not wanting to be limited by any particular theory, it is believed that the DAs disclosed herein may degrade a degradable polymer by way of, inter alia, a nucleophilic substitution reaction at the carbonyl carbon of the —COO— group. Nucleophilic substitution reactions at the carbonyl carbon of a carboxy group are generally thought to follow a nucleophilic addition-elimination mechanism. In general, a nucleophilic substitution reaction occurs when a nucleophile becomes attracted to a full or partial positive charge on an electrophile. During the reaction, the nucleophile forms a chemical bond to the electrophile by donating both bonding electrons and displacing another functional group that was previously bonded to the electrophile. Generally, all molecules or ions with a free pair of electrons can act as nucleophiles, however, negative ions (anions) may be more potent than neutral molecules. A neutral nitrogen atom in a molecule (e.g., an amine) is more nucleophilic than a neutral oxygen atom in a neutral molecule (e.g., in water, alcohol or ether). The nucleophiles of the present disclosure may be neutral or negatively charged Lewis bases. In general, the more basic the ion (i.e., the higher the $pK_a$ of the conjugate acid), the more reactive the ion may be as a nucleophile. In the degradable polymers of the current disclosure, the electrophile is the carbon of a carbonyl group of the —COO— functional group in the polymer backbone.

According to certain embodiments of the present disclosure, while not wanting to be limited by any particular theory, it is believed that the DAs may degrade the degradable polymer through a hydrolytic or aminolytic pathway. The lone electron pair of any of the amine groups or any of the lone electron pairs of any hydroxyl or otherwise oxygen-containing groups in the DA may act as a nucleophile.

By way of explanation and not of limitation, it is believed that according to some embodiments, the hydrolysis of a degradable polymer may be expressed by the following exemplary pathway shown in Scheme I:

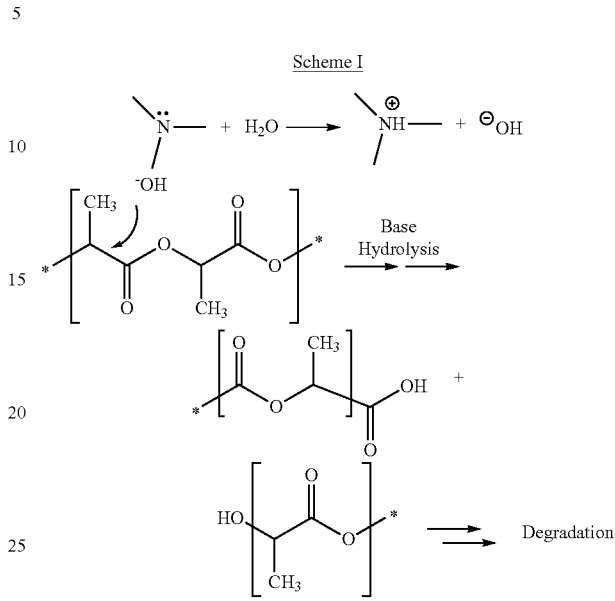

In Scheme I, the DA may serve to provide a more reactive hydroxide ion nucleophile that increases the rate of polymer degradation compared to when the degradation is dependent on reaction with a neutral water molecule.

Similarly, it is believed that according to some embodiments the aminolysis of a degradable polymer in an aqueous environment may be expressed by the following exemplary pathway in Scheme II:

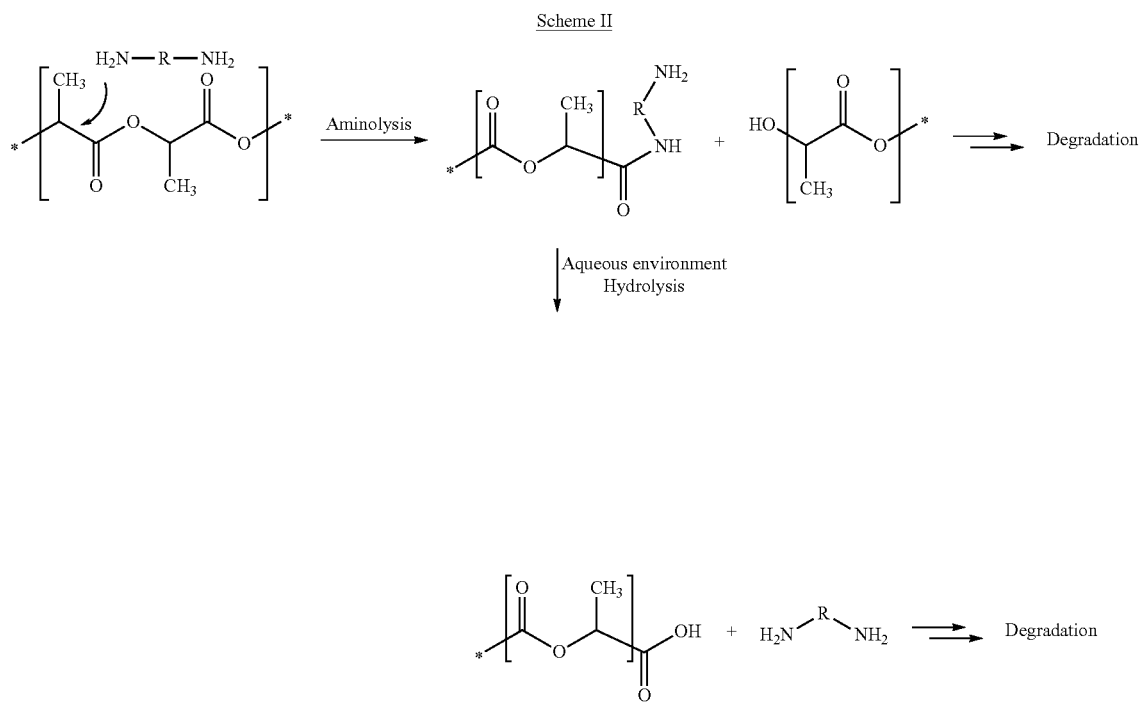

where R may be any of the DAs that contain a primary amine group. While Scheme II only depicts the nucleophilic attack by a primary amine group, the same aminolysis pathway may occur via a nucleophilic attack by any secondary amine group of the degradation accelerators described herein.

In general, the rate of degradation of the degradable polymers suitable for use in the present disclosure may be influenced by several factors including temperature, the type of chemical bond in the polymer backbone, hydrophilicity or hydrophobicity of the degradable polymer, the molecular weight of the degradable polymer, particle size and shape, porosity, crystallinity, and the presence of low molecular weight compounds (e.g., molecular weights lower than about 500) in the degradable polymer.

In some embodiments, it is believed that the degradation of the degradable polymer may be caused by the reaction of water (i.e., hydrolysis) with a labile —COO— bond of the degradable polymer, such as an ester or anhydride bond in a polylactide chain. The reaction rate may be closely related to the ability of the degradable polymer to absorb water. Typically, hydrophilic polymers are capable of absorbing a larger quantity of water than a hydrophobic matrix, and therefore, hydrophilic polymers usually degrade more quickly than hydrophobic matrices. In general, a degradable polymer with a greater amorphous content may be attacked more readily by the DAs of the present disclosure, and therefore may hydrolyze more readily than crystalline materials. Without being limited by theory, it is believed that hydrolytic polymer degradation reactions by hydrolysis with water or hydroxide ion (as shown in Scheme I), and aminolytic polymer degradation reactions by amine containing groups (as shown in Scheme II) may be taking place simultaneously at different rates of which aminolytic reactions are expected to be fastest followed by hydrolytic reactions with hydroxide ion. Hydrolytic reaction rates with neutral water are expected to be slowest. DA molecules are presumed to increase the rates of polymer degradation by providing the faster degradation pathways. Addition of inorganic bases such as alkali metal hydroxides or other pH-increasing inorganic material may increase the rates of degradation by the hydroxide ion pathway described in Scheme I, but the amine DA materials provide faster aminolytic pathways as described in Scheme II, as well as by the hydrolytic pathway described in Scheme 1 due to increased levels of hydroxide ion in the aqueous fluid in the presence of amines.

In an embodiment, the degradable polymer comprises amorphous PLA. In such embodiments, PLA is degraded by contact with an aqueous solution of propylenediamine at temperatures ranging from about 60° F. (15.6° C.) to about 120° F. (48.9° C.).

In an embodiment, the degradable polymer comprises semi-crystalline PLA. In such embodiments, PLA is swollen first by contact with an aqueous solution of triethanolamine and then degraded with another DA at temperatures ranging from about 120° F. (48.9° C.) to about 250° F. (121.1° C.).

In an embodiment, the degradable polymer comprises poly (glycolic acid). In such embodiments, poly(glycolic acid) is degraded by contact with an aqueous solution of propylenediamine at temperatures ranging from about 80° F. (26.7° C.) to about 150° F. (65.6° C.).

In an embodiment, the degradable polymer comprises semi-crystalline PLA with a melting point of about 140° F. (60° C.). In such embodiments, PLA is degraded by contact with an aqueous solution of propylenediamine at temperatures ranging from about 100° F. (37.8° C.) to about 200° F. (93.3° C.).

In an embodiment, the degradable polymer comprises a degradable semi-crystalline copolymer with a melting point of about 300° F. (148.9° C.) having lactic acid as one of the monomers. In such embodiments, the PLA copolymer is degraded by contact with an aqueous solution of ethanolamine at temperatures ranging from about 100° F. (37.8° C.) to about 180° F. (82.2° C.).

In an embodiment, the degradable polymer comprises a degradable semi-crystalline copolymer with a melting point of about 300° F. (148.9° C.) having lactic acid as one of the monomers. In such embodiments, the PLA copolymer is degraded by contact with an aqueous solution of triethylenetetraamine at temperatures ranging from about 140° F. (60° C.) to about 300° F. (148.9° C.).

In an embodiment, the degradable polymer comprises a physical blend of degradable semi-crystalline polymers with melting points of 140° F. (60° C.) and 240° F. (115.6° C.) and having PLA as one of the blend components. In such embodiments, the degradable polymer blend is degraded by contact with an aqueous solution of ethanolamine at temperatures ranging from about 180° F. (82.2° C.) to about 320° F. (160° C.).

In an embodiment, the degradable polymer is used in combination with a DA that causes initial swelling of the polymer, followed by degradation of the degradable polymer.

In an embodiment, the degradable polymer is used in the presence of more than one DAs, of which one DA is added for the purpose of swelling the polymer, and the other DA is for the purpose of degrading the polymer. Thus in an embodiment, a method of servicing a wellbore comprises introducing into the wellbore a degradable polymer ("DM") and at least a first and a second DA of the type disclosed herein where the first and the second DA differ and where the first and second DAs may be added sequentially or simultaneously.

In an embodiment, the DA comprises an amine of the type disclosed herein (e.g., alkanolamine, aziridine, etc.). The DA may be introduced into the wellbore in the form of a delayed-action construct ("DAC") of the type depicted in FIG. 2. Referring to FIG. 2A, the DAC 100 comprises a DA 20 on a solid support 30, which is encapsulated by an encapsulating material 10.

In an embodiment, the solid support comprises any material that can associate with the DA and is compatible with the other materials of this disclosure. The solid support may be an organic or an inorganic material. The solid support may further be characterized as hydrophobic, alternatively the support may be hydrophilic. Examples of materials suitable for use as the solid support in the DAC include without limitation crushed nut shells (for example, walnuts), diatomaceous earth, clay, zeolite, polymeric resin, lignite, inorganic oxides (e.g., silica, alumina, aluminaphosphates, and the like), and any combination thereof.

In an embodiment, the solids support comprises clay. As used herein, the term "clay" refers to aggregates of hydrous silicate particles either naturally-occurring or synthetically-produced, less than 4 micrometers (μm) in diameter and may consist of a variety of minerals rich in silicon and aluminum oxides and hydroxides which include variable amounts of other components, such as alkali earth metals and water. Clays are most commonly formed by chemical weathering of silicate-bearing rocks, although some are formed by hydrothermal activity. These clays may be replicated in industrial chemical processes. Examples of clays that may be suitable for use in this disclosure may include without limitation clays from the following groups: kaolinite, serpentine, illite, chlorite, smectite, and any combination thereof. Examples of suitable kaolinite group clays may include without limitation kaolinite, dickite, halloysite, nacrite, and any combination thereof. Examples of suitable illite group clays may include without limitation clay-mica, illite, and any combination thereof.

In an embodiment, the solid support comprises a zeolite. Zeolites are three-dimensional, microporous, crystalline solids with well-defined porous structures. Zeolites, which may be either naturally occurring or synthesized, comprise a group of hydrated alumina silicates that are linked in a three dimensional framework through shared oxygen atoms. Examples of zeolites suitable for use in this disclosure may include without limitation analcrime, chabazite, heulandite, natrolite, phillipsite, stilbite, and any combination thereof.

In an embodiment, the solid support comprises a polymeric resin such as, for example, an ion-exchange resin. Ion-exchange resins are polymeric resins that contain charged functional groups. The base polymer is usually a crosslinked material, such as polystyrene that is crosslinked with a vinyl polymer. Examples of polymeric resins suitable for use in this disclosure include without limitation diethyl aminoethyl or quaternary aminoethyl substituted polystyrene. Suitable commercially available ion-exchange resins for use in the present disclosure may include without limitation MONO-Q® and MONO-S®, available from Pharmacia Biotech in Piscataway, N.J.

In an embodiment, the solid support comprises a lignite. Lignite is a brownish black coal that has a high inherent moisture content and high ash content compared to bituminous coal. It is a heterogeneous mixture and often has a woodlike texture.

In some embodiments, the solid support may be obtained from natural sources, alternatively the substrate may comprise synthetic analogs of the materials described herein. In an embodiment, the solid support may be present in amount of from about 30 wt. % to about 80 wt. %, alternatively from about 40 wt. % to about 70 wt. %, or alternatively from about 50 wt. % to about 60 wt. % based on the dry weight of DAC.

In an embodiment, the DAC comprises an encapsulating material. The encapsulating material may function as a barrier that inhibits disassociation of the DA from the solid support. In an embodiment, the encapsulating material functions as a substantially impenetrable barrier that prevents disassociation of the DA from the solid support. In such embodiments, disassociation of the DA from the solid support may occur subsequent to a reduction in structural integrity of the encapsulating material that removes some portion of the substantially impenetrable barrier. As will be understood by one of ordinary skill in the art, under such circumstances, the function of the DAC is delayed for a time period necessary to affect the structural integrity of the encapsulating material. The structural integrity of the encapsulating material may be affected by any number of factors, such as, for example, wellbore temperature, the presence of materials that decrease the structural integrity of the encapsulating material, and the like.

In an alternative embodiment, the encapsulating material functions as an external coating through which the encapsulated material (e.g., DA) diffuses. As will be understood by one of ordinary skill in the art, in such embodiments, the function of the DAC is delayed for the time period necessary for the DA to pass through the encapsulating material and into the wellbore and/or wellbore servicing fluids.

Examples of other encapsulating materials suitable for use in this disclosure may include without limitation ethylene propylene diene monomer (EDPM) rubber, polyvinyldichloride, nylon, waxes, polyurethanes, cross-linked partially hydrolyzed acrylics, cross-linked polyurethane, a drying oil (e.g., tung oil, linseed oil, and the like), and any combination thereof.

In an embodiment, the encapsulating material may comprise without limitation biopolymers, polysaccharides, hydrocolloids, gums, and any combination thereof. In an embodiment, the encapsulating material, upon contact with water, may hydrate the outer surface forming a gel layer that encloses the encapsulated material (e.g., DA). For example, the encapsulating material may comprise cellulose-based polymers, cellulose ethers, methylcellulose, hydroxypropyl methylcellulose, ethylhydroxyethylcellulose, methylhydroxyethylcellulose, bacterial and plant based gums, xanthan, diutan, gellan, gum tragacanth, pestan, and the like, and any combination thereof.

In an embodiment, a DAC of the type disclosed herein may be prepared using any suitable methodology. For example, the DA may be associated with the solid support such as by spray-coating the DA onto the solid support or by impregnating the solid support with the DA. The resulting material is termed a DA/solid support. The DA/solid support can be further associated with an encapsulating material, all of the type disclosed herein.

In an embodiment, the DA/solid support may be encapsulated by spray-coating a variety of materials thereon. In an alternative embodiment, the liquid DA may be encapsulated in a particulate porous solid material that remains dry and free flowing after absorbing the liquid DA and through which the DA slowly diffuses. Examples of such particulate porous solid materials may include without limitation crushed nut shells (e.g., walnuts), diatomaceous earth, zeolites, silica, alumina, metal salts of alumino-silicates, clays, hydrotalcite, styrenedivinylbenzene-based materials, cross-linked polyalkylacrylate esters, cross-linked modified starches, and any combination thereof. In such embodiments, an external coating of an encapsulating material through which a DA slowly diffuses can be placed on the particulate porous solid material.

Figure 2B:
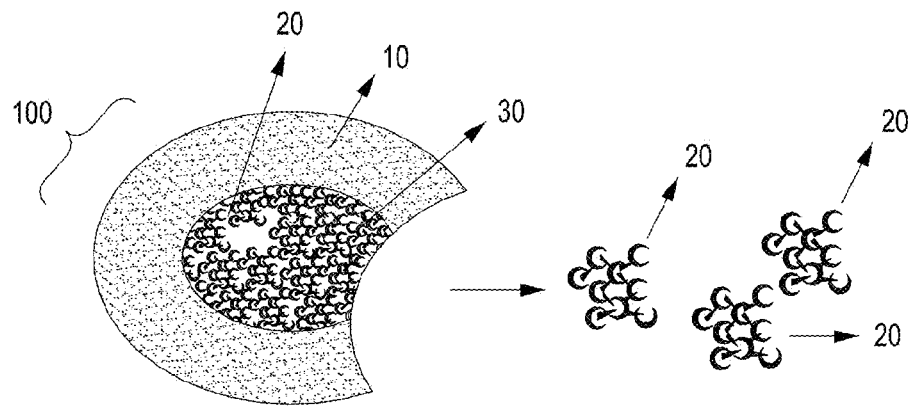
Figure 2C:
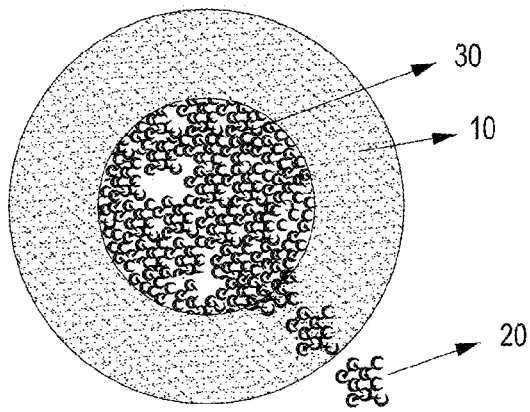

Referring to FIG. 2B, a DAC 100 placed in a wellbore may have encapsulation material 10 whose structural integrity is compromised, allowing the DA 20 to dissociate from the solid support 30. In an alternative embodiment and referring to FIG. 2C, the DAC may comprise the encapsulation material 10 and the DA 20 associated with the solid support 30. In such an embodiment, the DA 20 may dissociate from the solid support 30 and migrate through the encapsulation material 10 into a wellbore servicing area.

The DAs and/or DMs disclosed herein may be included in any suitable wellbore servicing fluid ("WSF"). As used herein, a "wellbore servicing fluid" or "servicing fluid" refers to a fluid used to drill, complete, work over, fracture, repair, or in any way prepare a wellbore for the recovery of materials residing in a subterranean formation penetrated by the wellbore. Examples of servicing fluids include, but are not limited to, cement slurries, drilling fluids or muds, spacer fluids, fracturing fluids, acidizing fluids, drill-in fluids, or completion fluids. It is to be understood that "subterranean formation" encompasses both areas below exposed earth and areas below earth covered by water such as ocean or fresh water.

The aqueous fluids that may be utilized in the WSF may be fresh water, saltwater (e.g., water containing one or more salts dissolved therein), brine (e.g., saturated saltwater), seawater, and any combination thereof. In certain embodiments, an aqueous fluid may be present in the WSF used in the methods of the present disclosure in an amount in the range of from about 40 wt. % to about 99 wt. % based on the total weight of the WSF. In certain embodiments, an aqueous fluid may be present in the WSF used in the methods of the present disclosure in an amount in the range of from about 20 wt. % to about 80 wt. % based on the total weight of the WSF. One of ordinary skill in the art, with the benefit of this disclosure, will recognize the appropriate amount of an aqueous fluid for a chosen application.

In an embodiment, the WSF comprises a suspending agent. The suspending agent in the WSF may function to prevent the DA particulates (e.g., aziridine oligomer derivatives) from settling in the suspension during its storage or before reaching its downhole target (e.g., a portion of the wellbore and/or subterranean formation comprising degradable polymer). In an embodiment, the suspending agent in the WSF may function to prevent the fully or partially degraded or non-degraded DM from settling during flow back subsequent to treatment with a DA. In accordance with the methods of the present disclosure, the suspending agent may comprise microfine particulate materials, (e.g., less than about 1 micron), hereinafter referred to as colloidal materials, clays and/or viscosifying or gel forming polymers.

Nonlimiting examples of colloidal materials suitable for use in the present disclosure may include carbon black, lignite, brown coal, humic acid, styrene-butadiene rubber latexes, polyvinyl alcohol latexes, acetate latexes, acrylate latexes, precipitated silica, fumed/pyrogenic silica, viscoelastic surfactant micelles, and any combination thereof.

Nonlimiting examples of clays suitable for use in the present disclosure may include bentonite, attapulgite, kalonite, meta kalonite, laponite, hectorite, sepiolite, and any combination thereof.

Nonlimiting examples of viscosifying or gel forming polymers suitable for use in the present disclosure may include a copolymer of 2-acrylamido-2-methylpropane sulfonic acid and N,N-dimethylacrylamide, carrageenan, scleroglucan, xanthan gum, guar gum, hydroxypropylguar, hydroxyethylcellulose, carboxymethylhydroxyethylcellulose, welan gum, succinoglycan, copolymers or terpolymers of acrylamidomethyl propane sulfonate, N,N-dimethylacrylamide, acrylic acid, vinyl acetate, and any combination thereof.

In an embodiment, the suspending agent may be present in the WSF in an amount of from about 0.01 wt. % to about 10 wt. %, alternatively from about 0.1 wt. % to about 5 wt. %, or alternatively from about 0.25 wt. % to about 1.5 wt. % based on the total weight of the WSF.

The WSF may further comprise additional additives as deemed appropriate by one of ordinary skill in the art, with the benefit of this disclosure. Additives may be used singularly or in combination. Examples of such additional additives may include, but are not limited to, pH-adjusting agents, pH-buffers, oxidizing agents, enzymes, lost circulation materials, scale inhibitors, surfactants, clay stabilizers, fluid loss control additives, and any combination thereof. Nonlimiting examples of such additives are also described in U.S. Patent Publication No. 20100273685 A1, which is incorporated by reference herein in its entirety.

The DM (degradable polymer) may be introduced into a subterranean formation for any of a number of uses. In some embodiments, degradable polymers may be used in subterranean operations as fluid loss control particles, diverting agents, filter cake components, drilling fluid additives, cement additives, and the like. In certain embodiments, the degradable polymer may be in a mechanical form, such as in a downhole tool (e.g., plugs, sleeves, and the like), or as a coating on a metallic tool. In other embodiments, the degradable polymer may be present in a filter cake that is present in the subterranean formation. For example, the degradable polymer may be introduced into the formation as part of the fluid that forms the filter cake, such that the filter cake contains the degradable polymer. In some instances, the degradable polymer may be capable of releasing a desirable degradation product (e.g., an acid) during its hydrolysis or otherwise breakdown. The acid released by certain degradable polymers may be used to facilitate a reduction in the viscosity of a fluid or to degrade a filter cake, as well as for numerous other functions in subterranean operations. Accordingly, the methods of the present disclosure may be used in any subterranean operation in which the degradation of a degradable polymer is desired.

In some embodiments, a degradable polymer may be introduced into a subterranean formation by including the degradable polymer in the WSF (e.g., a fracturing fluid or an acidizing fluid). Such a WSF may comprise an aqueous fluid (e.g., an aqueous carrier fluid) and a degradable polymer. Depending on the application, the WSF further may comprise one or more of the following: a suspending agent, a crosslinking agent, a bridging agent, and a proppant.

A degradable polymer may be included in the WSFs in an amount sufficient for a particular application. For example, in embodiments where degradable polymers capable of releasing an acid are used, a degradable polymer may be present in the WSF in an amount sufficient to release a desired amount of acid. In some embodiments, the amount of the released acid may be sufficient to reduce the viscosity of the treatment fluid to a desired level. In another embodiment, the amount of the released acid may be sufficient to facilitate the degradation of an acid-soluble component, for example, an acid-soluble component of a filter cake, an acid-soluble component adjacent to a filter cake, or an acid-soluble component (e.g., calcium carbonate) of a proppant pack.

In certain embodiments, a degradable polymer may be present in the WSF in an amount in the range of from about 1% to about 30% by weight of the WSF. In certain embodiments, a degradable polymer may be present in the WSF in an amount in the range of from about 3% to about 10% by weight of the WSF. One of ordinary skill in the art, with the benefit of this disclosure, will be able to determine the appropriate amount of a degradable polymer to include in a treatment fluid for a particular application.

WSFs, in addition to introducing degradable polymers into a wellbore and/or subterranean formation, may also be used to introduce a DA or a DAC into the wellbore and/or subterranean formation. For example, a WSF comprising a DA or a DAC may place the DA or DAC proximate to or in contact with the DM present in the wellbore and/or subterranean formation. Accordingly, in some embodiments, a WSF may comprise a DA or a DAC in addition to or in lieu of a DM. Such WSFs may be used to hydrolyze degradable polymers present in the fluid or present in the wellbore and/or subterranean formation (e.g., in a filter cake, in a proppant pack, or in a downhole tool). The DA may be present in amounts not less than about 20% of the calculated stoichiometric amounts in relation to the molar amounts of the ester groups present in the degradable polymer it is intended to degrade. The molar amounts of the ester groups may be calculated by dividing the estimated weight of the degradable polymer by the estimated molecular weights of the monomers present in the degradable polymer. The molar amounts of the DAs may be calculated by dividing the estimated weight of the active DA content by the molecular weight of the monomer (e.g., aziridine) or the DA molecule (e.g., triethanolamine). The DA may be present in the WSF in an amount in the range of from about 0.1 wt. % to about 50 wt. % based on the total weight of the WSF. In some embodiments, the DA may be present in an amount in the range of from about 1 wt. % to about 15 wt. % based on the total weight of the WSF. When the DAC is used in combination with the DM, the amount of DAC may be in the range of from about 10 wt. % to about 60 wt. % by weight of the DM, and the amount of DAC may be dependent on the amount of DA present in the DAC, the desired rate of DM degradation, the desired duration of DM degradation, and the like.

In some embodiments, the DA and/or the DAC may be placed in the formation prior to the placement of the DM. As previously mentioned, the term "DA" refers to both the DA solutions (non-particulate form) and the particulate DAs as described in some embodiments herein. In such cases, the DA and/or the DAC may be made to contact the DMs by drawing down the pressure on the wellbore, for example by putting the well back on production. Alternately, the DA and/or the DAC and the DM may be pumped together along with the well treatment fluid (e.g., a fracturing fluid). Alternately, the DA and/or the DAC may be placed in the wellbore to contact the DM already placed in the wellbore. Accordingly, the DM and DA and/or the DAC may be placed into the wellbore in any suitable order or combination necessary to meet the objectives of a given wellbore service, for example simultaneously (including one or more DMs combined with one or more DAs and/or DACs in a common WSF, or a first WSF comprising one or more DMs placed simultaneously with a second WSF comprising one or more DAs and/or DACs, such as pumping the first WSF down the flowbore of a tubular placed in a wellbore and pumping the second WSF down an annulus between the tubular and the wellbore) or sequentially (e.g., a first WSF comprising one or more DMs pumped ahead or behind a second WSF comprising one or more DAs and/or DACs, for example, as one or more slugs of material that may stay constant or vary in sequence such as DM/DA; DM/DAC; DA/DM; DAC/DM; DM/DA/DM/DA; DA/DM/DA; DA/DM/DA/DM/DA; DAC/DM/DAC/DM/DAC; DM/$1^{st}$ DA/$2^{nd}$ DA; $1^{st}$ DA/$1^{st}$ DM/$2^{nd}$ DM/$2^{nd}$ DA; DM/$1^{st}$ DAC/$2^{nd}$ DAC; etc.)

According to some embodiments, a WSF comprising a degradable polymer may be introduced to a wellbore and/or subterranean formation simultaneously with the introduction of a DA and/or a DAC that does not adversely react with or otherwise interfere with any aspect of the WSF. In other embodiments, a DA and/or DAC may be introduced to the wellbore and/or subterranean formation subsequent to the introduction of the degradable polymer. In some embodiments, a degradable polymer, which may be provided in any of a number of forms (e.g., in a filter cake) may be contacted with a DA and/or a DAC subsequent to the introduction of the degradable polymer into the wellbore and/or subterranean formation.

For example, in certain embodiments, the present disclosure provides a method of treating at least a portion of a wellbore and/or subterranean formation comprising providing a WSF that comprises an aqueous fluid, a degradable polymer capable of releasing an acid, and a DA and/or a DAC, and introducing the WSF into the wellbore and/or subterranean formation. At a chosen time or after a desired delay period, the DA and/or the DA forming part of the DAC hydrolyzes the degradable polymer so as to release an acid that facilitates a reduction in the WSFs viscosity.

In an embodiment, the WSF comprises a DAC and the DA is released from the solid support. In such embodiments, the DA may migrate through the encapsulating material or the structural integrity of the encapsulating material may be compromised sufficiently to allow release of the DA. The released DA may contact and accelerate degradation of the degradable polymer.

In some embodiments, a degradable polymer may be provided in a wellbore and/or subterranean formation by a fluid (e.g., a drill-in and servicing fluid) capable of forming a filter cake on the face of a portion of a wellbore and/or subterranean formation. Such fluids are used, among other things, to minimize damage to the permeability of the subterranean formation. Before desirable fluids, such as hydrocarbons, may be produced, the filter cake should be removed.

Accordingly, in certain embodiments of the present disclosure, a DA and/or a DAC may be introduced into a wellbore and/or subterranean formation to facilitate the removal of a filter cake that comprises a degradable polymer. When introduced into the wellbore and/or subterranean formation, the DA and/or DAC degrades the degradable polymer.

In an embodiment, a DA or DAC of the type disclosed herein may be used in conjunction with stimulation techniques designed to increase the complexity of fractures by first plugging the pores in existing fractures and then diverting the fracturing fluid to initiate other fractures. ACCESS-FRAC$^{SM}$ Stimulation Service is an example of such a stimulation service commercially available from Halliburton Energy Services, Inc. in Houston, Tex. In such embodiments, the pores may be plugged with a diverter material such as the ones described in the present disclosure. BIOVERT® NWB Diverting System is an example of a temporary polyester-based diverting agent commercially available from Halliburton Energy Services, Inc. in Houston, Tex. In such applications, the degradable polymers may comprise a multimodal particle size distribution, for example, bimodal or trimodal particle size distributions. In such an embodiment, the degradable polymer comprising a multimodal polymer particle size distribution may contain particles with sizes ranging from about 5 mm to about 20 microns, alternatively from about 3 mm to about 50 microns, or alternatively from about 1 mm to about 100 microns.

To improve efficiency of the diverting process, the degradable polymers after placement may be treated with a swelling DA which will swell the degradable polymer particles forming a continuous mass of diverting plug before the degradation process sets in. The DA or the DAC may be advantageously used for removing the diverter plugs under wellbore conditions where the BHT is less than about 320° F. (160° C.), alternatively less than about 140° F. (60° C.), or alternatively less than about 100° F. (37.8° C.). By properly selecting the diverting polymer sizes and choosing a suitable DA or DAC of the type disclosed herein, the wait time for putting the well on production may be advantageously shortened to less than about 1 week, alternatively less than about 3 days. In the case of a DAC and DM combination, the diverting plug can comprise solid materials comprised of DM and DAC, and the plug can be designed to self-degrade at predefined degradation rates and duration by combining the two solid materials in weight ratios determined in the laboratory based on downhole conditions.

In an embodiment, the DA or DAC of the type disclosed herein may be used in conjunction with stimulation techniques which are designed to create highly conductive fractures. In an embodiment, the degradable polymer may be advantageously soaked and/or immersed in a DA solution or in an aqueous fluid comprising a particulate DA and then pumped downhole, thereby removing the need to place the DA solution or the aqueous fluid comprising the particulate DA separately. In such embodiments, the degradable polymer may be soaked in a DA solution or in the aqueous fluid comprising a particulate DA for a time period of from about 6 hours to about 72 hours, alternatively from about 12 hours to about 48 hours, or alternatively from about 16 hours to about 24 hours. While the degradable polymer may function as a diverter downhole, the DA solution or the aqueous fluid comprising a particulate DA will concurrently degrade the polymer in an advantageously shorter timeframe of less than about 1 week, alternatively less than about 3 days. In such an embodiment, the degradable polymer (e.g., PLA) may be used at a BHT of less than about 140° F. (60° C.).

In an embodiment, the degradable polymer may be used for assembling a degradable filter cake with drill-in fluids. In such an embodiment, the degradable polymer comprises multimodal polymer particles with sizes ranging from about 1 mm to about 20 microns, alternatively from about 0.5 mm to about 50 microns, or alternatively from about 500 microns to about 100 microns. The filter cake may perform its intended function and it may be subsequently advantageously removed with a DA solution, DA particulate, or DAC of the type disclosed herein. The DA solution may have a pH of less than about 12, alternatively less than about 11, or alternatively less than about 10. Alternatively, the degradable filter cake may comprise a DAC comprising a particulate salt DA. The DA in the filter cake may be activated by contacting the filter cake with a neutralizer activator. Alternatively, the DAC may comprise a particulate salt DA that may be pre-contacted with a neutralizer activator prior to assembling the filter cake with the degradable polymer.

In various embodiments, systems configured for delivering the fluids comprising the DAs and/or DACs described herein to a downhole location are described. In various embodiments, the systems can comprise a pump fluidly coupled to a tubular, the tubular containing a fluid comprising the DAs and/or DACs described herein.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the fluid to the high pressure pump. In such embodiments, the low pressure pump may "step up" the pressure of the fluid before it reaches the high pressure pump.

In some embodiments, the systems described herein can further comprise a mixing tank that is upstream of the pump and in which the fluid fluids comprising the DAs and/or DACs described herein is formulated. In various embodiments, the pump (e.g., a low pressure pump, a high pressure pump, or a combination thereof) may convey the fluid from the mixing tank or other source of the fluid to the tubular. In other embodiments, however, the fluids comprising the DAs and/or DACs described herein can be formulated offsite and transported to a worksite, in which case the fluid may be introduced to the tubular via the pump directly from its shipping container (e.g., a truck, a railcar, a barge, or the like) or from a transport pipeline. In either case, the fluid may be drawn into the pump, elevated to an appropriate pressure, and then introduced into the tubular for delivery downhole.

FIG. 3 shows an illustrative schematic of a system that can deliver fluids comprising the DAs and/or DACs of the present disclosure to a downhole location, according to one or more embodiments. It should be noted that while FIG. 3 generally depicts a land-based system, it is to be recognized that like systems may be operated in subsea locations as well. As depicted in FIG. 3, system 200 may include mixing tank 202, in which a fluid comprising the DAs and/or DACs of the present invention may be formulated. The fluid may be conveyed via line 204 to wellhead 206, where the fluid enters tubular 208, tubular 208 extending from wellhead 206 into subterranean formation 210. Upon being ejected from tubular 208, the fluid comprising the DAs and/or DACs described herein may subsequently penetrate into subterranean formation 210. Pump 212 may be configured to raise the pressure of the fluid to a desired degree before its introduction into tubular 208. It is to be recognized that system 200 is merely exemplary in nature and various additional components may be present that have not necessarily been depicted in FIG. 3 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 3, the fluid may, in some embodiments, flow back to wellhead 206 and exit subterranean formation 210. In some embodiments, the fluid that has flowed back to wellhead 206 may subsequently be recovered and recirculated to subterranean formation 210.

It is also to be recognized that the disclosed fluids may also directly or indirectly affect the various downhole equipment and tools that may come into contact with the fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 3.

Embodiments disclosed herein include:

A. A method of servicing a wellbore comprising: providing a degradable polymer within a portion of a wellbore and/or a subterranean formation;

providing a wellbore servicing fluid comprising a particulate salt degradation accelerator and a neutralizer activator, wherein the particulate salt degradation accelerator is formed by reacting a degradation accelerator solution selected from the group consisting of an alkanolamine; an oligomer of aziridine; a polymer of aziridine; a diamine; and any combination thereof, with an acid, and wherein the neutralizer activator is capable of dissociating the acid by neutralization from the particulate salt degradation accelerator so as to form a neutralized degradation accelerator; introducing the wellbore servicing fluid into a wellbore and/or a subterranean formation; contacting the degradable polymer with the neutralized degradation accelerator; and degrading the degradable polymer.

B. A method of servicing a wellbore comprising: providing a degradable polymer within a portion of a wellbore and/or a subterranean formation;

providing a first wellbore servicing fluid comprising a particulate salt degradation accelerator, wherein the particulate salt degradation accelerator is formed by reacting a degradation accelerator solution selected from the group consisting of an alkanolamine; an oligomer of aziridine; a polymer of aziridine; a diamine; and any combination thereof, with an acid; providing a second wellbore servicing fluid comprising a neutralizer activator; introducing the first wellbore servicing fluid into the wellbore and/or subterranean formation; introducing the second wellbore servicing fluid into the wellbore and/or subterranean formation; contacting the particulate salt degradable accelerator with the neutralizer activator, wherein the neutralizer activator is capable of dissociating the acid from the particulate salt degradation accelerator so as to form a neutralized degradation accelerator; contacting the degradable polymer with the neutralized degradation accelerator; and degrading the degradable polymer.

C. A method of servicing a wellbore comprising: providing a wellbore servicing fluid comprising a degradable polymer, a particulate salt degradation accelerator, and a neutralizer activator, wherein the particulate salt degradation accelerator is formed by reacting a degradation accelerator solution selected from the group consisting of an alkanolamine; an oligomer of aziridine; a polymer of aziridine; a diamine; and any combination thereof, with an acid, and wherein the neutralizer activator is capable of dissociating the acid from the particulate salt degradation accelerator so as to form a neutralized degradation accelerator; introducing the wellbore servicing fluid into a wellbore and/or a subterranean formation; contacting the degradable polymer with the neutralized degradation accelerator; and degrading the degradable polymer.

Each of embodiments A, B, and C may have one or more of the following additional elements in any combination:

Element 1: Wherein the acid is selected from the group consisting of an organic acid; an inorganic acid; and any combination thereof.

Element 2: Wherein the organic acid is selected from the group consisting of lactic acid; acetic acid; formic acid; citric acid; oxalic acid; tartaric acid; benzoic acid; phthalic acid; and any combination thereof.

Element 3: Wherein the inorganic acid is selected from the group consisting of hydrochloric acid; nitric acid; phosphoric acid; sulfuric acid; boric acid; hydrofluoric acid; hydrobromic acid; perchloric acid; and any combination thereof.

Element 4: Wherein the neutralizer activator is selected from the group consisting of an oxide of an alkali metal; a hydroxide of an alkali metal; an oxide of an alkaline earth metal; a hydroxide of an alkaline earth metal; and any combination thereof.

Element 5: Wherein at least a calculated stoichiometric amount of the neutralizer activator is included in the wellbore servicing fluid.

Element 6: Wherein the neutralizer activator is included in the wellbore servicing fluid in an amount in the range from about 0.1% to about 200% greater than a calculated stoichiometric amount.

Element 7: Wherein the step of: introducing the first wellbore servicing fluid into the wellbore and/or subterranean formation, is performed prior to the step of: introducing the second wellbore servicing fluid into the wellbore and/or subterranean formation.

Element 8: Wherein the step of: introducing the first wellbore servicing fluid into the wellbore and/or subterranean formation, is performed after the step of: introducing the second wellbore servicing fluid into the wellbore and/or subterranean formation.

Element 9: Wherein the step of: introducing the first wellbore servicing fluid into the wellbore and/or subterranean formation, is performed simultaneously with the step of: introducing the second wellbore servicing fluid into the wellbore and/or subterranean formation.

Element 10: Wherein the wellbore servicing fluid is introduced into the wellbore and/or the subterranean formation using a pump.

Element 11: Wherein at least one of the first wellbore servicing fluid and the second wellbore servicing fluid is introduced into the wellbore and/or the subterranean formation using a pump.

By way of non-limiting example, exemplary combinations applicable to A, B, and C include: A with 1, 5, and 10; A with 1, 2, and 6; B with 3 and 5; B with 2, 4, 9, and 11; C with 1 and 5; and C with 4 and 6.

To facilitate a better understanding of the embodiments of the present disclosure, the following examples of preferred or representative embodiments are given. In no way should the following examples be read to limit, or to define, the scope of the disclosure.

Example 1

Five commercial samples of degradable polymers polyesters comprising —COO— bond(s) in the polymer back bone were obtained. Except for two, all polymers contained lactic acid as one of the monomers. Based on nuclear magnetic resonance spectroscopy it was established that, except for two samples, all samples contained exclusively poly(lactic acid). One polymer sample contained an additional monomer. One sample was polyglycolic acid. The crystallinity of the PLA containing samples was measured by Differential Scanning Calorimeter ("DSC") by heating the sample from room temperature to 392° F. (200° C.), holding the sample at 392° F. (200° C.) for 30 minutes, cooling it to room temperature and reheating to 392° F. (200° C.) at a rate of 10° C./minute. Glass transition temperatures ($T_g$), melting temperatures ($T_m$), and crystallization temperatures ($T_c$) observed during the second cycle are reported in Table 2. Polyglycolic acid (Sample 5) was not characterized by DSC. A sample for which the area of the melting peak increased substantially during the second heating cycle is deemed to be originally a low crystallinity material. All others are referred to as amorphous or semi-crystalline materials.

TABLE 2

| Sample | $T_g$ | $T_m$ | $T_c$ | Comments |
|---|---|---|---|---|
| 1-(PLA) | Not observable | 140° F. (60° C.) | 120° F. (48.9° C.) | Low crystallinity |
| 2-(PLA) | 76° F. (24.4° C.) | Not observable | Not observable | Amorphous |
| 3-(PLA) | Not observable | 312° F. (155.6° C.) | 210° F. (98.9° C.) | Semi-crystalline |
| 4-(PLA + a | Not | 125° F. | 90° F. | Melt blend |

TABLE 2-continued

| Sample | $T_g$ | $T_m$ | $T_c$ | Comments |
|---|---|---|---|---|
| polyester) | observable | (51.7° C.) and 235° F. (112.8° C.) | (32.2° C.) and 165° F. (73.9° C.) | of two semi-crystalline polymers |

The degradation tests were performed by first grinding the materials and sieving them. The particles that went through a 20 mesh sieve were collected and used in the degradation studies. A solid sample of 1 gram of the degradable polymer was placed in 100 ml of tap water and about a stoichiometric amount of DA was added. The stoichiometric amounts of the DA solution required were calculated by dividing the weight of degradable polymer sample by the molecular weight of monomer (e.g., lactic acid in the case of PLA based polymer and glycolic acid in the case of polyglycolic acid) to obtain moles of —COO— bonds present in the polymer, and calculating the weight of degrading agent containing equivalent moles of nitrogen atoms. The mixtures were kept in a water bath heated to 140° F. (60° C.). Comparative samples using water and ethylenediamine as the degrading agents were also investigated. The amines tested included triethylenetetramine ("TETA") as a representative aziridine oligomer (Formula II, n=3), and polyethyleneimine ("PEI") as polymerized aziridine (Formula IV, n=>>100). PEI is commercially available from Halliburton Energy Services, Inc. in Houston, Tex. as HZ-20™ crosslinker. Ethylenediamine (EDA) also served as representative example of higher homologues of ethylenediamine (Formula V, Z=3-6, and R5, R6, R7 and R8 are hydrogens). Alkanolamines used in the study included ethanolamine (EA), triethanolamine (TEA) and triisopropanolamine (Formula I). The progress of the polymer degradation was measured by determining the remaining weight of degradable polymer at periodic intervals by filtering the polymer mixture, drying the undissolved solid, and measuring its weight. The results for samples utilizing an aziridine oligomer, aziridine polymer and diamine as the DA are presented in Tables 3 and 4. Table 3 presents the results from measuring remaining polymer weights at 140° F. (60° C.) after 3, 6 and 9 days. Table 4 provides results for % polymer degradation of semicrystalline PLA and semicrystalline polymer blends Samples 3 and 4, respectively, after 25 days at 140° F. (60° C.).

TABLE 3

| Degradable Polymer | Amine compound | Remaining weight (g)/ 3 days | Remaining weight (g)/ 6 days | Remaining weight (g)/ 9 days |
|---|---|---|---|---|
| Sample 1 | None | 1.41 | 1.26 | 1.17 |
| (Low crystallinity | TETA | 1.24 | 0.95 | 0.65 |
| PLA) | EDA | 0.71 | 0.36 | 0.26 |
|  | PEI | 2.03 | 1.72 | 0.97 |
| Sample 2 | None | 0.79 | 0.27 | 0.14 |
| (amorphous PLA) | TETA | 0.95 | NA | 0.13 |
|  | EDA | 0.05 | 0.12 | 0.11 |
|  | PEI | 0.70 | Not measured | 0.25 |
| Sample 3 | None | 1.13 | 1.19 | 1.21 |
| (semi-crystalline | TETA | 0.83 | 0.73 | 0.59 |
| PLA) | EDA | 0.62 | 0.29 | 0.20 |
|  | PEI | 1.22 | Not measured | 1.29 |
| Sample 4 | None | 1.73 | 1.24 | Not measured |
| (crystalline polymer blend) | TETA | 1.22 | 1.21 | 1.53 |
|  | EDA | 1.28 | 1.27 | 1.22 |
|  | PEI | 1.89 | 1.19 | 1.12 |

TABLE 3-continued

| Degradable Polymer | Amine compound | Remaining weight (g)/ 3 days | Remaining weight (g)/ 6 days | Remaining weight (g)/ 9 days |
|---|---|---|---|---|
| Sample 5 | None | 1.11 | 1.15 | 0.97 |
| (semi-crystalline | TETA | 0.68 | 0.43 | 0.40 |
| PGA) | EDA | 0.31 | 0.13 | 0.11 |
|  | PEI | 1.19 | 1.39 | 1.04 |

The results in Table 3 demonstrate that, semi-crystalline polymers have a tendency to increase in weight when placed in water, whereas such behavior was not observed for the amorphous polymer. The increased weight in water for the semi-crystalline polymer persisted even after 9 days, indicating no polymer degradation. The amorphous polymer degraded significantly in water over 6 days. All DA solutions degraded the amorphous polymer rapidly with the diamines providing the fastest degradation rates (<4 days). Among the semi-crystalline polymers, the weight increase was highest and polymer degradation lowest when using DA solutions comprising an aziridine polymer indicating that the aziridine polymers (i.e., Formula IV, n=>>100) may be more suitable as polymer swelling agents. In general, increases in polymer weight were accompanied by swelling of the polymer particles. Therefore, polymers of aziridine may be more suitable for swellable degradable semi-crystalline polymers for improved fluid diversion efficiency, fluid loss control, and filter cake fluid loss control efficiency. Swollen particles contain minimized interparticle porosity; encourage particle fusion forming a continuous layer of filter cake, or a single fused mass of plug blocking flow of fluid more effectively. Ethylene diamine containing only primary amine groups was more effective as a degradation accelerator than the aziridine oligomer, TETA, which contained the same number of primary amine groups but also contained two secondary amine groups. None of the DA solutions were effective in accelerating degradation of the most crystalline polymer blend (Sample 4) and they all increased the degradable polymer weight due to swelling even after 9 days.

TABLE 4

| Degradation Accelerator | % Degradation for Sample 3 | % Degradation for Sample 4 |
|---|---|---|
| None | 1 | 13 |
| TETA | 64 | 20 |
| EDA | 93 | 9 |
| PEI | 2 | 0 |

The results after 25 days testing at 140° F. (60° C.) shown in Table 4 indicate that of the two polymers which were most resistant to degradation namely Samples 3 and 4, the former showed the most accelerated degradation in the presence of aziridine oligomer, TETA, and the diamine, EDA compared to when only water was present, whereas the latter polymer showed reasonably accelerated degradation rates with aziridine oligomer. The polymeric aziridine was not effective in degrading the polymer even after such a long duration.

The results for alkanolamine-accelerated polymer degradation in 4 days at 140° F. (60° C.) are shown in Table 5.

TABLE 5

| Degradable Polymer | Alkanolamine | % Degradation in 4 days @140° F. (60° C.) |
|---|---|---|
| Sample 1 (Low crystallinity PLA) | Control | 0 |
| | EA | 19 |
| | TEA | 0 |
| Sample 2 (amorphous PLA) | Control | 20 |
| | EA | 100 |
| | TEA | 100 |
| Sample 3 (semi-crystalline PLA) | Control | 5 |
| | EA | 57 |
| | TEA | 8 |
| Sample 4 | Control | 2 |
| | EA | 35 |
| | TEA | 6 |

The 4-day results shown in Table 5, and their comparison with the 3 or 6-day results shown for the DAs in Table 3 demonstrate that ethanolamine is an effective polymer degradation accelerator for all polymers irrespective of the polymer crystallinity. The results also indicate that for semi-crystalline polymers, ethanolamine is a more effective DA than the amines.

Example 2

The effectiveness of DAs of the type disclosed herein on polymer swelling was studied by measuring swollen polymer weights in the presence of DA materials. Results in Table 3 indicated that semi-crystalline polymers swell in the presence of water itself. However, initial swelling rates for semi-crystalline polymers are higher when using polyethyeleneimine than water. Swelling was not observed for the amorphous polymer with water or amine-based DA solutions. Amorphous polymer (Sample 2) swelled in the presence of trialkanolamines, namely triethanolamine and triisopropanolamine, significantly more than in water as shown in FIG. 1. In this example, five beads (shown in FIG. 1) of Sample 2 polymer were separately placed in 100 ml of water, a solution of triethanolamine ("TEA") and a solution of triisopropanolamine, and the samples were kept in a water bath at 140° F. (60° C.) for two days. The results shown in FIG. 1 for aminoalcohols combined with the results presented in Table 5 indicate that the swelling step by the DAs may be preceding the degradation step or both processes may be taking place simultaneously. In the latter case, the swelling process may be a kinetically-controlled process whereas the degradation may be thermodynamically controlled. The polymer swelling by aminoalcohol- and amine-based DA solutions initially before the degradation rates accelerate allow for improving the performance of the polymers by forming a continuous mass of solid degradable polymer which can increase the fluid loss, plugging, and diversion efficiency of the degradable polymers.

Example 3

In this example, the ability of the particulate DAs as disclosed herein to degrade the degradable polymers of some embodiments herein was evaluated. Ethylenediamine ("EDA"), a DA solution according to the embodiments disclosed herein, was compared to ethylenediamine hydrochloride ("EDA.2HCl"), a particulate form of EDA to form a particulate DA. A 0.7% w/v control solution of EDA in 100 ml of tap water was prepared. Three test samples of 0.77% w/w EDA.2HCl were prepared, each in 100 ml of tap water (TS1-TS3). Because EDA.2HCl is in salt form, 0.77% w/w of EDA.2HCl is equivalent to 0.7% w/v of EDA used in the control sample). To each test sample, either no neutralizer activator was included, or 1.5× the calculated stoichiometric amount of a strongly basic sodium hydroxide neutralizer activator, or the calculated stoichiometric amount of a weakly basic sodium bicarbonate neutralizer activator was added. The amount of neutralizer activator added to the EDA.2HCL was estimated to match or exceed the pH of EDA (the DA solution in non-particulate form) to completely neutralize the acid component of the particulate DA salt, such that comparison of the effectiveness of degradation using EDA versus EDA.2HCl in the presence of a neutralizer activator could be achieved. The composition of the samples is shown in Table 6.

TABLE 6

| Sample | Neutralizer Activator | pH |
|---|---|---|
| Control (0.7% EDA) | N/A | 11.4 |
| TS1 (0.77% w/w EDA•2HCl) | N/A | 5.9 |
| TS2 (0.77% w/w EDA•2HCl) | NaOH (1.5 x calculated stoichiometric amount) | 13.0 |
| TS3 (0.77% w/w EDA•2HCl) | Na$_2$CO$_3$ (calculated stoichiometric amount) | 9.4 |

The results in Table 6 indicate that the pH of EDA.2HCl is significantly lower than that for EDA, when no neutralizer activator is present. However, upon adding a neutralizer activator, the pH was brought much closer to that of EDA. Sodium hydroxide (NaOH) was a more effective neutralizer activator than sodium bicarbonate (Na$_2$CO$_3$). Indeed, a substantial excess (a 3.6% solution, or greater than about 600 times the calculated stoichiometric amount) of sodium bicarbonate was added to TS3 to eventually reach a pH of 11.4 of EDA; however the amount of excess required did not prove to enhance the degradation acceleration properties of the EDA.2HCl. Thus, the strength of the basic neutralizer activator may play an important role in defining the effectiveness of a particulate DA, particularly depending on the particular DA that it is paired with. In this experiment, sodium hydroxide is a better neutralizer activator for use with particulate DE EDA.2HCl.

Figure 4:
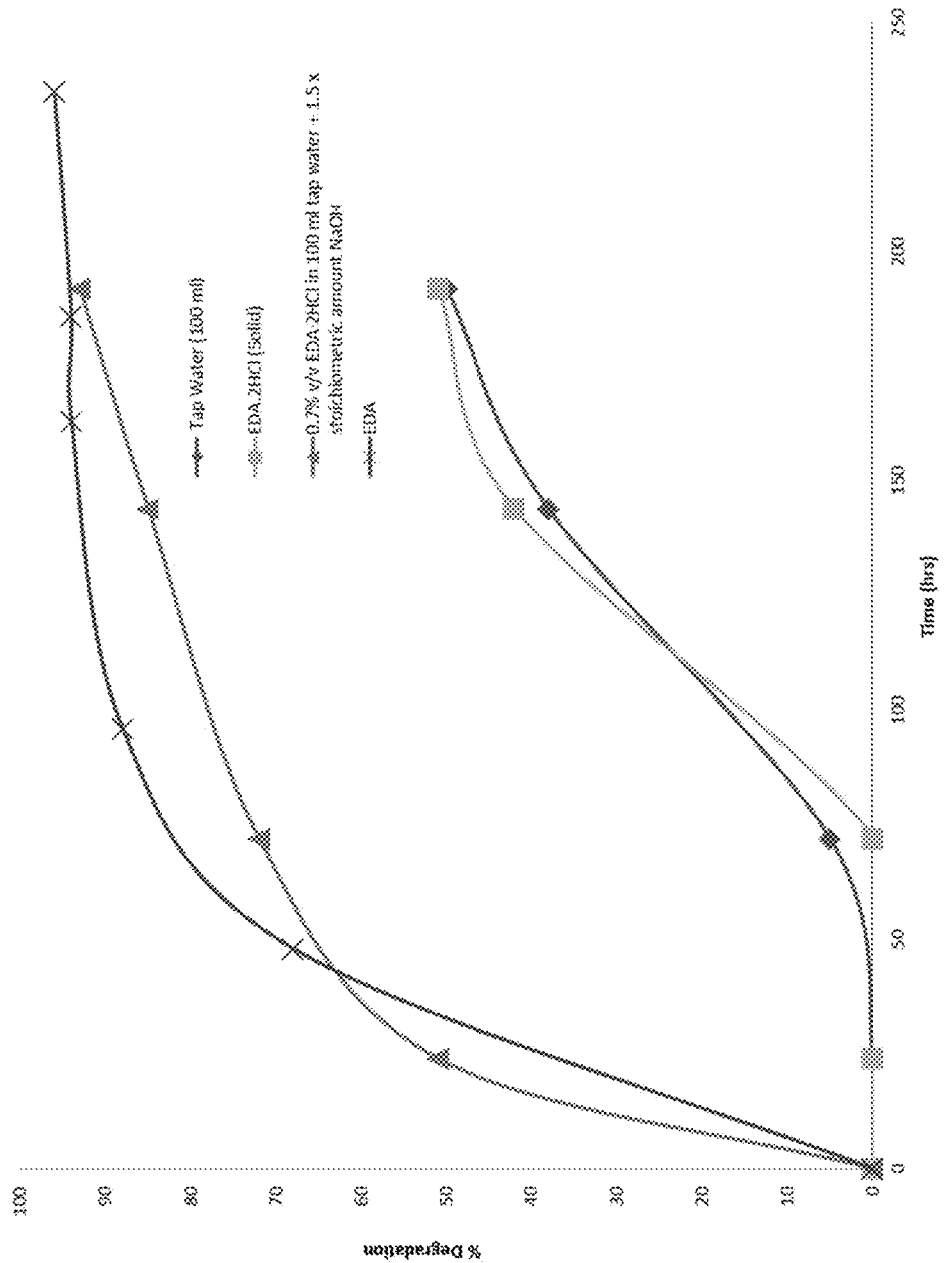
FIG. 4 shows the degradation rate of a degradable polymer using after exposure to degrading agents as disclosed in some embodiments herein.

Degradation rates were measured for the samples in Table 6 corresponding to the Control, TS1, TS2, and 100 ml of tap water. To each 100 ml sample, 1 gram of PLA was added to determine the degradation rates. Each sample was kept at 160° F. (71.1° C.) in a water bath and tested at time points up to approximately 200 hours. The results are shown in FIG. 4. As shown, water and EDA.2HCl performed poorly as DAs for use in degrading the degradable polymer PLA. However, both pure EDA and particulate EDA.2HCl neutralized with sodium hydroxide achieved approximately 95% degradation of PLA after approximately 200 hours, demonstrating that neutralized particulate DAs, as described herein, may be used in place of or in combination with DA solutions (and/or DACs). On the other hand, sodium bicarbonate used at the calculated stoichiometric amount showed significantly lower degradation rates after 200 hours elapsed, demonstrating that weak basic neutralizer activators may not be able to completely neutralize the acid portion of a particulate DA salt, at least when used in calculated stoichiometric amounts, based on the observation that the pH of TS3 was significantly less (9.4) than the pH of the Control of pure EDA (11.4).

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, RL, and an upper limit, RU, is disclosed, any number falling within the range is specifically disclosed. In particular, the following numbers within the range are specifically disclosed: R=RL+k*(RU−RL), wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method of servicing a wellbore and/or a subterranean formation comprising:
   providing a degradable polymer within a portion of the wellbore and/or the subterranean formation;
   providing a servicing fluid comprising a particulate salt degradation accelerator and a neutralizer activator,
   wherein the particulate salt degradation accelerator is formed by reacting a degradation accelerator solution selected from the group consisting of a diamine, with an acid,
   wherein the neutralizer activator is capable of dissociating the acid by neutralization from the particulate salt degradation accelerator so as to form a liquid neutralized degradation accelerator, and
   included in the wellbore servicing fluid to dissociate substantially all of the acid from the particulate salt degradation accelerator;
   introducing the wellbore servicing fluid into a wellbore and/or a subterranean formation;
   contacting the degradable polymer with the liquid neutralized degradation accelerator; and
   degrading the degradable polymer.

2. The method of claim 1, wherein the acid is selected from the group consisting of an inorganic acid.

3. The method of claim 2, wherein the inorganic acid is selected from the group consisting of hydrochloric acid; nitric acid; phosphoric acid; sulfuric acid; boric acid; hydrofluoric acid; hydrobromic acid; perchloric acid; and any combination thereof.

4. The method of claim 1, wherein the neutralizer activator is selected from the group consisting of an oxide of an alkali metal.

5. The method of claim 1, wherein the neutralizer activator is included in the servicing fluid in an amount in the range from about 0.1% to about 200% greater than a calculated stoichiometric amount.

6. The method of claim 1, wherein the wellbore servicing fluid is introduced into the wellbore and/or the subterranean formation using a pump.

7. A method of servicing a wellbore and/or a subterranean formation comprising:
   providing a degradable polymer within a portion of the wellbore and/or the subterranean formation;
   providing a first wellbore servicing fluid comprising a particulate salt degradation accelerator,
   wherein the particulate salt degradation accelerator is formed by reacting a degradation accelerator solution selected from the group consisting of a diamine with an acid;
   providing a second servicing fluid comprising a neutralizer activator;
   introducing the first servicing fluid into the wellbore and/or subterranean formation;
   introducing the second servicing fluid into the wellbore and/or subterranean formation;
   contacting the particulate salt degradable accelerator with the neutralizer activator,
   wherein the neutralizer activator is capable of dissociating the acid from the particulate salt degradation accelerator so as to form a liquid neutralized degradation accelerator, and
   wherein at least a calculated stoichiometric amount of the neutralizer activator is included in the second wellbore servicing fluid to dissociate substantially all of the acid from the particulate salt degradation accelerator;
   contacting the degradable polymer with the liquid neutralized degradation accelerator; and
   degrading the degradable polymer.

8. The method of claim 7, wherein the step of:
   introducing the first wellbore servicing fluid into the wellbore and/or subterranean formation, is performed prior to the step of: introducing the second servicing fluid into the wellbore and/or subterranean formation.

9. The method of claim 7, wherein the acid is selected from the group consisting of an inorganic acid.

10. The method of claim 9, wherein the inorganic acid is selected from the group consisting of hydrochloric acid; nitric acid; phosphoric acid; sulfuric acid; boric acid; hydrofluoric acid; hydrobromic acid; perchloric acid; and any combination thereof.

11. The method of claim 7, wherein the neutralizer activator is selected from the group consisting of an oxide of an alkali metal.

12. The method of claim 7, wherein at least one of the first wellbore servicing fluid and the second servicing fluid is introduced into the wellbore and/or the subterranean formation using a pump.

13. A method of servicing a wellbore and/or a subterranean formation comprising:
   providing a wellbore servicing fluid comprising a degradable polymer, a particulate salt degradation accelerator, and a neutralizer activator,
   wherein the particulate salt degradation accelerator is formed by reacting a degradation accelerator solution selected from the group consisting a diamine, with an acid, wherein the neutralizer activator is capable of dissociating the acid from the particulate salt degradation accelerator so as to form a liquid neutralized degradation accelerator, and wherein at least a calculated stoichiometric amount of the neutralizer activator is included in the wellbore servicing fluid to dissociate substantially all of the acid from the particulate salt degradation accelerator;

introducing the wellbore servicing fluid into the wellbore and/or the subterranean formation;

contacting the degradable polymer with the liquid neutralized degradation accelerator; and degrading the degradable polymer.

14. The method of claim 13, wherein the acid is selected from the group consisting of an inorganic acid.

15. The method of claim 14, wherein the inorganic acid is selected from the group consisting of hydrochloric acid; nitric acid; phosphoric acid; sulfuric acid; boric acid; hydrofluoric acid; hydrobromic acid; perchloric acid; and any combination thereof.

16. The method of claim 13, wherein the neutralizer activator is selected from the group consisting of an oxide of an alkali metal.

17. The method of claim 13, wherein the servicing fluid is introduced into the wellbore and/or the subterranean formation using a pump.

* * * * *